US007429983B2

(12) United States Patent
Islam

(10) Patent No.: US 7,429,983 B2
(45) Date of Patent: Sep. 30, 2008

(54) PACKET-BASED DIGITAL DISPLAY SYSTEM

(75) Inventor: Mohammed N. Islam, Ann Arbor, MI (US)

(73) Assignee: Cheetah Omni, LLC, Ann Arbor, MI (US)

(*) Notice: Subject to any disclaimer, the term of this patent is extended or adjusted under 35 U.S.C. 154(b) by 146 days.

(21) Appl. No.: 11/553,212

(22) Filed: Oct. 26, 2006

(65) Prior Publication Data
US 2007/0101398 A1  May 3, 2007

Related U.S. Application Data

(60) Provisional application No. 60/732,345, filed on Nov. 1, 2005.

(51) Int. Cl.
G06F 3/038 (2006.01)
G06F 15/16 (2006.01)

(52) U.S. Cl. .................. 345/204; 709/230; 709/238; 725/111; 370/352; 370/411; 348/744

(58) Field of Classification Search .................. 345/204
See application file for complete search history.

(56) References Cited

U.S. PATENT DOCUMENTS

| 4,011,009 A | 3/1977 | Lama et al. ............. 350/162 R |
| 4,728,185 A | 3/1988 | Thomas ...................... 353/122 |
| 4,736,132 A | 4/1988 | Culp ........................... 310/328 |
| 4,836,649 A | 6/1989 | Ledebuhr et al. ............ 350/331 |
| 4,856,863 A | 8/1989 | Sampsell et al. ....... 250/227.26 |
| 4,900,119 A | 2/1990 | Hill et al. .................. 350/96.15 |
| 5,078,479 A | 1/1992 | Vuilleumier ................ 359/290 |
| 5,084,807 A | 1/1992 | McKechnie et al. ......... 362/228 |
| 5,153,752 A | 10/1992 | Kurematsu et al. ............ 359/40 |

(Continued)

FOREIGN PATENT DOCUMENTS

GB    2 071 896 A    9/1981

(Continued)

OTHER PUBLICATIONS

K. E. Petersen, "Micromechanical Light Modulator Array Fabricated On Silicon," Applied Physics Letters, vol. 31, No. 8, pp. 521-523, Oct. 15, 1977.

(Continued)

Primary Examiner—Duc Q Dinh
(74) Attorney, Agent, or Firm—Baker Botts L.L.P.

(57) ABSTRACT

An all-digital display system includes an electronic processor that is operable to receive an internet protocol video packet and to generate a control signal based at least in part on the internet protocol video packet. In one particular embodiment, the electronic processor includes at least a header processor, a CPU electronic processor, and a display processor unit. The all-digital display system also includes one or more light sources capable of generating one or more optical signals and one or more light modulating chips. The one or more light modulating chips are operable to receive the one or more optical signals and to modulate the one or more optical signals based at least in part on the control signal. The all-digital display system further comprises one or more display screens operable to receive the modulated signals communicated from the light modulating chips.

20 Claims, 17 Drawing Sheets

U.S. PATENT DOCUMENTS

| | | | | |
|---|---|---|---|---|
| 5,212,743 A | 5/1993 | Heismann | | 385/11 |
| 5,239,322 A | 8/1993 | Takanashi et al. | | 353/31 |
| 5,278,595 A | 1/1994 | Nishida et al. | | 353/78 |
| 5,278,652 A | 1/1994 | Urbanus et al. | | 358/160 |
| 5,287,096 A | 2/1994 | Thompson et al. | | 345/147 |
| 5,311,360 A | 5/1994 | Bloom et al. | | 359/572 |
| 5,374,968 A | 12/1994 | Haven et al. | | 353/31 |
| 5,392,151 A | 2/1995 | Nelson | | 359/223 |
| 5,398,082 A | 3/1995 | Henderson et al. | | 348/781 |
| 5,400,038 A | 3/1995 | Riza et al. | | 342/375 |
| 5,430,454 A | 7/1995 | Refregier et al. | | 342/375 |
| 5,444,566 A | 8/1995 | Gale et al. | | 359/291 |
| 5,452,024 A | 9/1995 | Sampsell | | 348/755 |
| 5,459,610 A | 10/1995 | Bloom et al. | | 359/572 |
| 5,473,457 A | 12/1995 | Ono | | 359/161 |
| 5,500,761 A | 3/1996 | Goossen et al. | | 359/290 |
| 5,526,051 A | 6/1996 | Gove et al. | | 348/388 |
| 5,583,688 A | 12/1996 | Hornbeck | | 359/291 |
| 5,608,468 A | 3/1997 | Gove et al. | | 348/771 |
| 5,654,819 A | 8/1997 | Goossen et al. | | 359/224 |
| 5,658,060 A | 8/1997 | Dove | | 353/33 |
| 5,659,412 A | 8/1997 | Hakki | | 359/156 |
| 5,659,418 A | 8/1997 | Yurke | | 359/290 |
| 5,661,592 A | 8/1997 | Bornstein et al. | | 359/291 |
| 5,666,487 A * | 9/1997 | Goodman et al. | | 709/246 |
| 5,684,631 A | 11/1997 | Greywall | | 359/565 |
| 5,696,619 A | 12/1997 | Knipe et al. | | 359/224 |
| 5,701,193 A | 12/1997 | Vogel et al. | | 359/290 |
| 5,706,061 A | 1/1998 | Marshall et al. | | 348/743 |
| 5,745,271 A | 4/1998 | Ford et al. | | 359/130 |
| 5,751,469 A | 5/1998 | Arney et al. | | 359/291 |
| 5,760,965 A | 6/1998 | Kim | | 359/651 |
| 5,771,116 A | 6/1998 | Miller et al. | | 359/295 |
| 5,786,934 A | 7/1998 | Chiu et al. | | 359/494 |
| 5,793,511 A | 8/1998 | Bulow | | 359/161 |
| 5,822,100 A | 10/1998 | Robinson et al. | | 359/161 |
| 5,825,528 A | 10/1998 | Goossen | | 359/291 |
| 5,826,959 A | 10/1998 | Atsuchi | | 353/20 |
| 5,835,255 A | 11/1998 | Miles | | 359/291 |
| 5,835,336 A | 11/1998 | Knipe et al. | | 361/233 |
| 5,841,579 A | 11/1998 | Bloom et al. | | 359/572 |
| 5,847,859 A | 12/1998 | Murata | | 235/462.35 |
| 5,850,492 A | 12/1998 | Morasca et al. | | 385/11 |
| 5,859,939 A | 1/1999 | Fee et al. | | 385/24 |
| 5,860,720 A | 1/1999 | Negishi et al. | | 353/74 |
| 5,870,221 A | 2/1999 | Goossen | | 359/290 |
| 5,879,065 A | 3/1999 | Shirochi et al. | | 353/8 |
| 5,905,545 A | 5/1999 | Poradish et al. | | 348/743 |
| 5,905,571 A | 5/1999 | Butler et al. | | 356/328 |
| 5,914,804 A | 6/1999 | Goossen | | 359/291 |
| 5,914,817 A | 6/1999 | Browning et al. | | 359/634 |
| 5,929,945 A | 7/1999 | Negishi et al. | | 348/825 |
| 5,930,414 A | 7/1999 | Fishman et al. | | 385/11 |
| 5,943,155 A | 8/1999 | Goossen | | 359/247 |
| 5,943,158 A | 8/1999 | Ford et al. | | 359/295 |
| 5,943,454 A | 8/1999 | Aksyuk et al. | | 385/22 |
| 5,949,571 A | 9/1999 | Goossen et al. | | 359/291 |
| 5,960,133 A | 9/1999 | Tomlinson | | 385/18 |
| 5,974,206 A | 10/1999 | Bricheno et al. | | 385/11 |
| 5,974,207 A | 10/1999 | Aksyuk et al. | | 385/24 |
| 5,982,554 A | 11/1999 | Goldstein et al. | | 359/629 |
| 5,986,796 A | 11/1999 | Miles | | 359/260 |
| 5,999,306 A | 12/1999 | Atobe et al. | | 359/295 |
| 6,002,513 A | 12/1999 | Goossen et al. | | 359/291 |
| 6,008,785 A | 12/1999 | Hewlett et al. | | 345/85 |
| 6,011,631 A | 1/2000 | Broddin et al. | | 358/298 |
| 6,017,123 A | 1/2000 | Bleha et al. | | 353/30 |
| 6,046,840 A | 4/2000 | Huibers | | 359/291 |
| 6,061,166 A | 5/2000 | Furlani et al. | | 359/224 |
| 6,072,923 A | 6/2000 | Stone | | 385/16 |
| 6,091,867 A | 7/2000 | Young et al. | | 349/197 |
| 6,104,515 A | 8/2000 | Cao | | 359/161 |
| 6,113,239 A | 9/2000 | Sampsell et al. | | 353/31 |
| 6,137,941 A | 10/2000 | Robinson | | 385/140 |
| 6,163,363 A | 12/2000 | Nelson et al. | | 355/32 |
| 6,172,796 B1 | 1/2001 | Kowarz et al. | | 359/224 |
| 6,186,629 B1 | 2/2001 | Iwamura et al. | | 353/31 |
| 6,204,946 B1 | 3/2001 | Aksyuk et al. | | 359/131 |
| 6,208,318 B1 | 3/2001 | Anderson et al. | | 345/1 |
| 6,212,309 B1 | 4/2001 | Nguyen et al. | | 385/17 |
| 6,247,814 B1 | 6/2001 | Lin | | 353/20 |
| 6,263,123 B1 | 7/2001 | Bishop et al. | | 385/15 |
| 6,268,952 B1 | 7/2001 | Godil et al. | | 359/247 |
| 6,299,312 B1 | 10/2001 | Choi et al. | | 353/31 |
| 6,309,071 B1 | 10/2001 | Huang et al. | | 353/31 |
| 6,317,171 B1 | 11/2001 | Dewald | | 348/756 |
| 6,375,330 B1 | 4/2002 | Mihalakis | | 353/31 |
| 6,381,387 B1 | 4/2002 | Wendland, Jr. | | 385/37 |
| 6,411,424 B1 | 6/2002 | Raj | | 359/291 |
| 6,430,328 B1 | 8/2002 | Culver et al. | | 385/16 |
| 6,430,345 B1 | 8/2002 | Dultz et al. | | 385/122 |
| 6,439,728 B1 | 8/2002 | Copeland | | 359/515 |
| 6,445,485 B1 | 9/2002 | Frigo et al. | | 359/246 |
| 6,445,502 B1 | 9/2002 | Islam et al. | | 359/571 |
| 6,457,830 B1 | 10/2002 | Choi | | 353/33 |
| 6,473,244 B1 | 10/2002 | Sugano | | 359/794 |
| 6,483,962 B1 | 11/2002 | Novotny | | 385/18 |
| 6,498,673 B1 | 12/2002 | Frigo et al. | | 359/246 |
| 6,522,800 B2 | 2/2003 | Lucero | | 385/16 |
| 6,525,860 B1 | 2/2003 | Holz et al. | | 359/251 |
| 6,530,666 B1 | 3/2003 | Smith et al. | | 353/121 |
| 6,538,787 B1 | 3/2003 | Moeller et al. | | 359/158 |
| 6,538,816 B2 | 3/2003 | Fuchs et al. | | 359/578 |
| 6,557,031 B1 * | 4/2003 | Mimura et al. | | 709/218 |
| 6,557,999 B1 | 5/2003 | Shimizu | | 353/20 |
| 6,580,849 B2 | 6/2003 | Chen et al. | | 385/18 |
| 6,584,120 B1 * | 6/2003 | Shiomoto et al. | | 370/473 |
| 6,587,159 B1 | 7/2003 | Dewald | | 348/744 |
| 6,619,804 B2 | 9/2003 | Davis et al. | | 353/98 |
| 6,633,694 B2 | 10/2003 | Tew | | 385/18 |
| 6,666,557 B1 | 12/2003 | Choi | | 353/31 |
| 6,676,280 B1 | 1/2004 | Takatsuka et al. | | 362/372 |
| 6,771,644 B1 * | 8/2004 | Brassil et al. | | 370/390 |
| 6,778,782 B1 | 8/2004 | Watley et al. | | 398/147 |
| 6,784,961 B2 | 8/2004 | Suzuki et al. | | 349/117 |
| 6,785,733 B1 * | 8/2004 | Mimura et al. | | 709/236 |
| 6,826,330 B1 | 11/2004 | Godil et al. | | 385/37 |
| 6,831,707 B2 | 12/2004 | Fukuda | | 349/9 |
| 6,844,974 B1 | 1/2005 | Islam et al. | | 359/573 |
| 6,847,479 B1 | 1/2005 | Islam et al. | | 359/359 |
| 6,856,459 B1 | 2/2005 | Islam et al. | | 359/485 |
| 6,859,301 B1 | 2/2005 | Islam et al. | | 359/291 |
| 6,882,771 B1 | 4/2005 | Islam et al. | | 385/24 |
| 6,900,919 B1 | 5/2005 | Islam et al. | | 359/224 |
| 6,931,071 B2 * | 8/2005 | Haddad et al. | | 375/240.28 |
| 6,940,647 B2 | 9/2005 | Islam et al. | | 359/485 |
| 6,950,225 B2 | 9/2005 | Islam et al. | | 359/291 |
| 6,972,886 B2 | 12/2005 | Islam et al. | | 359/225 |
| 6,977,936 B1 * | 12/2005 | Love et al. | | 370/395.5 |
| 7,116,862 B1 | 10/2006 | Islam et al. | | 385/24 |
| 7,180,475 B2 * | 2/2007 | Slobodin et al. | | 345/2.3 |
| 7,356,039 B1 * | 4/2008 | DiMambro | | 370/411 |
| 2002/0015230 A1 | 2/2002 | Pilossof et al. | | 359/558 |
| 2002/0044722 A1 | 4/2002 | Tew | | 385/18 |
| 2002/0079432 A1 | 6/2002 | Lee et al. | | 250/216 |
| 2002/0081070 A1 | 6/2002 | Tew | | 385/39 |
| 2002/0093721 A1 | 7/2002 | Knipe | | 359/291 |
| 2002/0105697 A1 | 8/2002 | Fabiny | | 359/128 |
| 2002/0105725 A1 | 8/2002 | Sweatt et al. | | 359/566 |
| 2003/0099013 A1 | 5/2003 | Su et al. | | 359/124 |

FOREIGN PATENT DOCUMENTS

| | | | |
|---|---|---|---|
| JP | 06-118455 A | 4/1994 | |

| | | |
|---|---|---|
| JP | 06-095035 | 8/1994 |
| JP | 09-281537 | 10/1997 |
| WO | WO 01/37021 A1 | 11/2000 |
| WO | WO 01/79795 A1 | 3/2001 |
| WO | WO 02/06860 A1 | 7/2001 |
| WO | WO 02/10822 A1 | 7/2001 |
| WO | WO 02/21191 A1 | 9/2001 |
| WO | WO 02/056521 A1 | 11/2001 |
| WO | WO 02/50588 A1 | 12/2001 |
| WO | WO 02/059655 A2 | 12/2001 |

OTHER PUBLICATIONS

O. Solgaard, et al., "Deformable Grating Optical Modulator," Optics Letters, vol. 17, No. 9, pp. 688-690, May 1, 1992.

W. R. Wiszniewski, et al., Mechanical Light Modulator Fabricated On A Silicon Chip Using Simox Technology, pp. 1027-1030, Dec. 1996.

M.W. Chbat, "High-spectral-efficiency transmission systems," OFC 2000, Baltimore, MD, ppTuJ1-1, 134-136, 2000.

J.W. Bayless, et al., "The Specification and Design of Bandlimited Digital Radio Systems," IEEE Transactions on Communications, vol. COM-27 (12): pp. 1763-1770, 1979.

D.E. Sene, et al., "Polysilicon Micromechanical Gratings for Optical Modulation," Elsevier vol. Sensors and Actuators (A 57), pp. 145-151, 1996.

D. M. Burns, et al., "Micro-Electro-Mechanical Variable Blaze Gratings," IEEE 10th Annual International Workshop on Micro Mechanical Systems, pp. 385-391, 1997.

Bulow, H., et al., "Measurement of the Maximum Speed of PMD Fluctuation in Installed Field Fiber," OFC '99, pp. WE4-1, 83-85, 1999.

A. Mecozzi, et al., "A simple compensator for high order polarization mode dispersion effects," OFC 2000, Baltimore, MD, pp. WL201, 192-194, 2000.

M. W. Chbat, "Mitigation of Polarization Mode Dispersion," OFC '99, San Diego, CA, pp. TuB3, 151-152, 1999.

Z. Pan, et al., "Chirp-Free Tunable PMD Compensation using Hi-Bi Nonlinearly-Chirped FBGs in a Dual-Pass Configuration," OFC 2000, Baltimore, MD, pp. ThII2-1, 113-115, 2000.

L. Y. Lin, et al., "Micromachined polarization-state controller and its application to polarization-mode dispersion compensation," OFC 2000, Baltimore, MD, pp. ThQ3-1, 244-246, 2000.

S. Lee, et al., "High-birefringence nonlinearly-chirped fiber Bragg grating for tunable compensation of polarization mode dispersion," OFC '99, San Diego, CA, pp. TuS3-1, 272-274, 1999.

J.W. Bayless, et al., "High Density Digital Data Transmission," National Telecommunications Conference, Dallas, TX, pp. 1-6, 1976.

Rudkevich et al., "Understanding polarization-mode dispersion," www.optoelectronics-world.com, 3 pages, Jun. 2000.

T. Takahashi, et al, "Automatic Compensation Technique for Timewise Fluctuating Polarisation Mode Dispersion in In-Line Amplifier Systems," Electronic Letters vol. 30 (4), pp. 348-349, 1994.

R.W. Corrigan, et al., "17.3: Calibration of a Scanned Linear Grating Light Value™ Projection System," www.siliconlight.com, 1999.

SLM, "GLV Application," brochure www.siliconlight.cm, 1999.

R.W. Corrigan, et al., "Grating Light Valve Technology for Projection Displays," Presented at the International Display Workshop, Kobe, Japan, 1998.

M. Ming, et al., "Principles and Applications of Optical Communications," Irwin, pp. 468 & 470, 1996.

R. Noe, et al., "Endless Polarization Control Systems for Coherent Optics," Journal of Lightwave Technology, vol. 6(7), pp. 1199-1208, 1988.

F. Heismann, "Analysis of a Reset-Free Polarization Controller for Fast Automatic Polarization Stabilization in Fiber-optic Transmission Systems," Journal of Lightwave Technology, vol. 12 (4), pp. 690-699, 1994.

SLM "The Grating Light Valve Technology," www.siliconlight.com, 1999.

SLM, "The Scanned Grating Light Valve Display Architecture," www.siliconlight.com, 1999.

D.M. Bloom, "The Grating Light Valve: revolutionizing display technology," www.siliconlight.com, 11 pages, 1999.

T. Ono, et al., "Key Technologies for Terabit/Second WDM Systems with High Spectral Efficiency of Over 1 bit/s/Hz," IEEE Journal, vol. 34 (11), pp. 20802088, Nov. 1998.

C. Pu, et al., "Micromachined Integrated Optical Polarization-State Rotator," IEEE Photonics Technology Letters, vol. 12 (10), pp. 1358-1360, Oct. 2000.

A. D. Sandel, et al., "Automatic Polarisation Mode Dispersion Compensation in 40 Gbit/s Optical Transmission System," Electronic Letters, vol. 34 (23), pp. 2258-2259, 1998.

H. Y. Pua, et al., "An Adaptive First-Order Polarization-Mode dispersion Compensation System Aided by Polarization Scrambling: Theory and Demonstration," Journal of Lightwave Technology, vol. 8 (6), pp. 832-841, 2000.

T. Kudou, et al., "Theoretical Basis of Polarization Mode Dispersion Equalization Up To The Second Order," Journal of Lightwave Technology, vol. 18 (4), pp. 614-617, 2000.

H. Kogelnik, et al., "Jones Matrix for Second-Order Polarization Mode Dispersion," Optics Letters, vol. 25 (1), pp. 19-21, 2000.

R. Noe, et al., "Polarisation Mode Dispersion Compensation at 20 Gbit/s with Fibre-Based Distributed Equaliser," Electronic Letters, vol. 34 (25), pp. 2421-2422, 1998.

D. A. Watley, et al., "Compensation of Polarisation-Mode Dispersion Exceeding One Bit Period Using Single High-Birefringence Fibre," Electronic Letters, vol. 35 (13), pp. 1094-1095, 1999.

H. Sunnerud, et al., "Analytical Theory for PMD-Compensation," IEEE Photonics Technology Letters, vol. 12 (1), pp. 50-52, 2000.

H. C. Lefevre, "Single-Mode Fibre Fractional Wave Devices and Polarisation Controllers," Electronic Letters, vol. 16 (20), pp. 778-780, 1980.

M. Sharma, et al., "Optical Circuits for Equalizing Group Delay Dispersion of Optical Fibers," Journal of Lightwave Technology, vol. 12 (10), pp. 1759-1765, 1994.

T. Ozeki, et al., "Polarization-Mode-Dispersion Equalization Experiment Using A Variable Equalizing Optical Circuit Controlled by a Pulse-Waveform-Comparison Algorithm," OFC '94, San Jose, CA, pp. TuN4, 62-64, 1994.

J. H. Winters, et al., "Experimental Equalization of Polarization Dispersion," IEEE Photonics Technology Letters, vol. 2 (8), pp. 591-593, 1990.

D. T. Amm, et al., "5.2: Grating Light Valve™ Technology: Update and Novel Applications," Presented at Society for Information Display Symposium, Anaheim, CA, pp. 1-4, May 1998.

D. T. Amm, et al., "Optical Performance of the Granting Light Valve Technology," Presented at Photonics West-Electronic Imaging, Sunnyvale, CA, pp. 1-8, 1999.

M. W. Chbat, et al., "Long Term Field Demonstration of Optical PMD Compensation on an Installed OC-192 Link," OFC '99, San Diego, CA, pp. Post-deadline paper PD12, 1999.

J. E. Ford, et al., "Fiber-Coupled Variable Attenuator Using a MARS Modulator," SPIE, vol. 3226, pp. 86-96, 1997.

D. M. Burns, et al., "Development of Micromechanical Variable Blaze Gratings," Elsevier Science S.A., vol. Sensors and Actuators, pp. 7-15, 1998.

C. K. Madsen, et al., "A Tunable Dispersion Compensating MEMS All-Pass Filter," IEEE Photonics Technology Letters, vol. 12 (6), pp. 651-653, 2000.

J. E. Ford, et al., "Passband-Free Dynamic WDM Equalization," ECOC '98, Madrid, Spain, pp. 317-318, 1998.

K. W. Goossen, et al., "Micromechanical Gain Slope Compensator for Spectrally Linear Optical Power Equalization", 2000.

K. W. Goossen, et al., "Silicon Modulator Based on Mechanically-Active Anti-Reflection Layer with 1 Mbit/sec Capability for Fiber-in-the-Loop Applications," IEEE Photonics Technology Letters, vol. 6 (9), pp. 1119-1121, 1994.

L. Y. Lin, et al., "Angular-Precision Enhancement in Free-Space Micromachined Optical Switches," IEEE Photonics Technology Letters, vol. 11 (10), pp. 1253-1255, 1999.

L. Y. Lin, et al., "Free-Space Micromachined Optical Switches with Submillisecond Switching Time for Large-Scale Optical Crossconnects," IEEE Photonics Technology Letters, vol. 10 (4), pp. 525-527, 1998.

L. Y. Lin, et al., "Optical Crossconnects for High-capacity Lightwave Networks," Journal of High Speed Networks, pp. 17-34, 1999.

E. P. Furlani, et al., "Analysis of grating light valves with partial surface electrodes," American Institute of Physics, vol. 83 (2), pp. 629-634, 1998.

E. P. Furlani, et al., "Theory and simulation of viscous damped reflection phase gratings," J. Phys. D: Appl. Phys., vol. 32, pp. 412-416, 1999.

K. Aratani, et al., "Surface micromachined tuneable interferometer array," Sensors and Actuators, vol. 43, pp. 17-23, 1994.

R. T. Howe, et al., "Polycrystalline Silicon Micromechanical Beams," Journal Electrochemical Society, vol. 130 (6), pp. 1420-1423, 1983.

S. R. Mallinson, "Wavelength-selective filters for single-mode fiber WDM systems using Fabry-Perot interferometers," Applied Optics, vol. 26 (3), pp. 430-436, 1987.

N. G. Walker, et al., "Polarization Control for Coherent Communications," Journal of Lightwave Technology, vol. 8 (3), pp. 438-458, 1990.

T. Okoshi, "Polarization-State Control Schemes for Heterodyne or Homodyne Optical Fiber Communications," Journal of Lightwave Technology, vol. LT-3 (6), pp. 1232-1236, 1985.

L. Y. Lin, et al., "Optical-layer Networking: Opportunities for and Progress in Lightwave Micromachines," OFC 2000, Baltimore, MD, pp. 1-88, 2000.

Burnett et al., "Diffraction and Interference," in E. U. Condon and H. Odishaw, eds., *Handbook of Physics* (McGraw-Hill, New York, Toronto, and London), pp. 6-102 and 6-103, 1958.

"Polarization Mode Dispersion (PMD)," Cables & Components Technical Papers, http://www.usa.alcatel.com/cc/techprs/fnlpmd2.htm, 2000.

Curtis Menyuk, University of Maryland, Baltimore County "PMD in Optical Transmission System," Menyuk tutorial, OFC 2000, pp. 78-97 specifically pp. 92-94, Mar. 2000.

Yeh, et al., "Overcoming Polarization Impairments," Fiberoptic Product News www.fpnmag.com Special Feature, 5 pages, Oct. 2000.

Walker et al., "Endless Polarisation Control using Four Fibre Squeezers," Electronics Letters, vol. 23, No. 6, 3 pages, Mar. 12, 1987.

Nelson, et al., "Polarization Mode Dispersion Measurement and Impact on High Bit-rate Systems," Lucent Technologies and Bell Labs Innovations, OOA/IPR2000, Paper JWA2, 34 pages, Jul. 12, 2000.

Girard et al., "PDM: The New Telecommunication Frontier Emerges," Lasers & Optronics®, Fiberoptics, http://www.lasersoptmag.com, 6 pages, Feb. 1997.

Mark Shtaif, et al. "A Compensator for the Effects of High-Order Polarization Mode Dispersion in Optical Fibers," IEEE Photonics Tech. Letters, vol. 12, No. 4, pp. 434-436, Apr. 2000.

C. M. Ragdale, et al., "Integrated Laser and Add-Drop Optical Multiplexer for Narrowband Wavelength Division Multiplexing," Electronic Letters, vol. 28, No. 89, pp. 712-714, Apr. 9, 1992.

K. Aratani, et al., "Process and Design Considerations for Surface Micromachined Beams for A Tuneable Interferometer Array in Silicon," Handbook of Physics, pp. 230-235, 1993.

F. Roy, et al., "A simple dynamic polarization mode dispersion compensator," OFC '99, San Diego, CA, pp. TuS4-1, 275-277, 1999.

C. Marxer, et al., "Megahertz Opto-Mechanical Modulator," Elsevier Science S.A., pp. 46-50, 1996.

C. M. Ragdale, et al., "Integrated Three Channel Laser and Optical Multiplexer for Narrowband Wavelength Division Multiplexing," Electronics Letters, vol. 30, No. 11, pp. 897-898, May 26, 1994.

K. O. Hill, et al., "Narrow-Bandwidth Optical Waveguide Transmission Filters," Electronic Letters, vol. 23, No. 9, pp. 465-466, Apr. 23, 1987.

D.M. Burns, et al., "Designs to improve polysilicon micromirror surface topology," SPIE vol. 3008, pp. 100-110, 1997.

N. Choksi, et al., "Maskless extreme ultraviolet lithography," J. Vac. Sci. Technol. B 17(6) ( © 1999 American Vacuum Society), pp. 3047-3051, Nov./Dec. 1999.

Y. Shroff, et al., "Fabrication of parallel-plate nanomirror arrays for extreme ultraviolet maskless lithography," J. Vac. Sci. Technol. B 19(6) ( © 2001 American Vacuum Society), pp. 2412--2415, Nov./Dec. 2001.

Y. Chen, et al., "Modeling and Control of Nanomirrors for EUV Maskless Lithography," Technical Proc. Int. Conf. Modeling and Simulations of Microsystems, San Diego, CA, 3 pages, Mar. 2000.

U. Ljungblad, et al., "New laser pattern generator for DUV using a spatial light modulator," Microelectronic Engineering, Elsevier Science B.V., pp. 23-29, 2001.

S. Singh-Gasson, et al., "Maskless fabrication of light-directed oligonucleotide microarrays using a digital micromirror array," Nature Biotechnology vol. 17, pp. 974-978, Oct. 17, 1999.

H. Shin, "Micromirror and its Applications," MEMS Laboratory, Samsung Advanced Institute of Technology, slide presentation, 16 pgs, Apr. 19, 2002.

Texas Instruments White Paper, Single-Panel DLP™ Projection System Optics, DM Discovery™, Application Report, Discovery DLPA002, 32 pages, Mar. 2005.

* cited by examiner

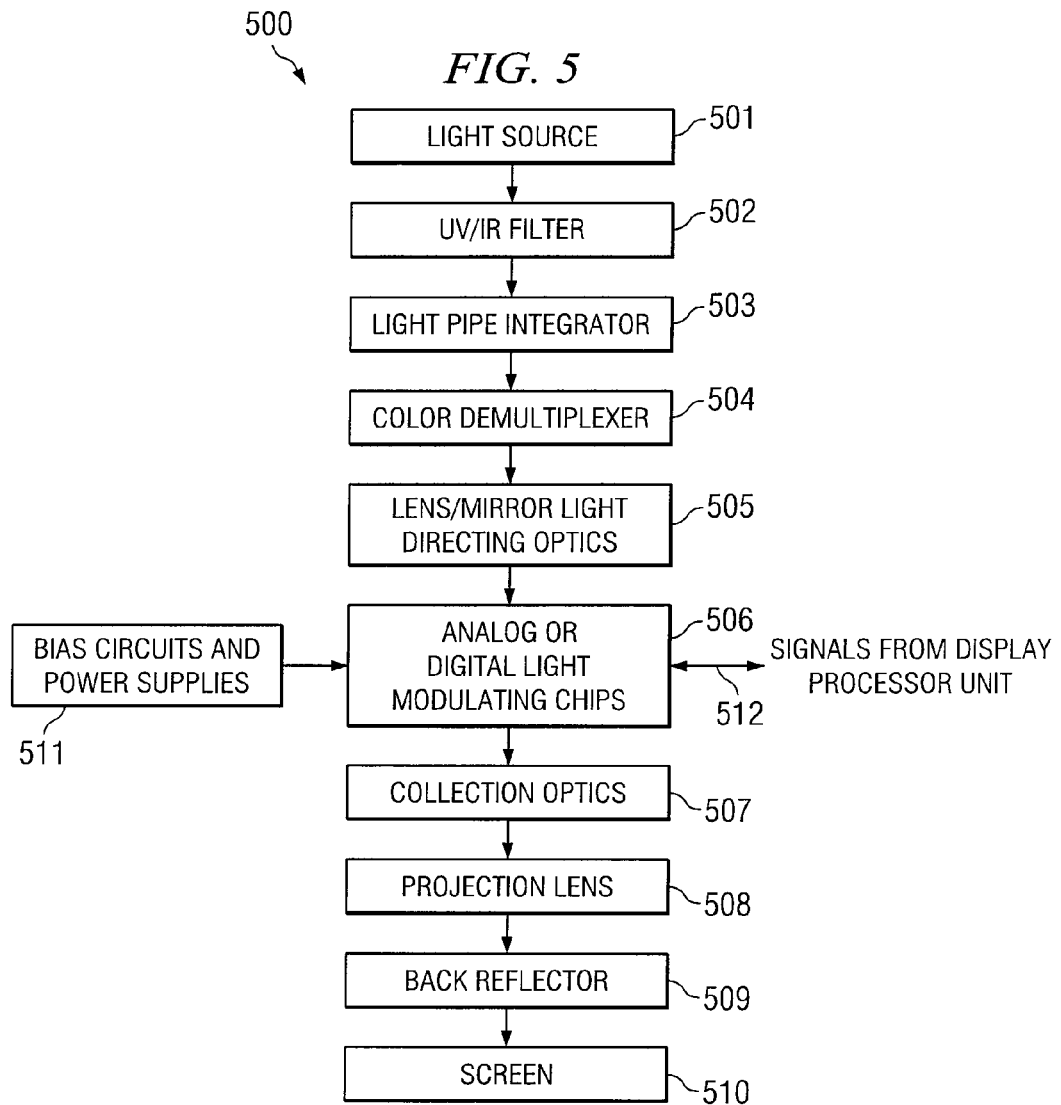

PACKET-BASED DIGITAL DISPLAY SYSTEM

RELATED APPLICATION

This application claims priority to U.S. Provisional Patent Application Ser. No. 60/732,345, filed Nov. 1, 2005, entitled "PACKET-BASED DIGITAL DISPLAY SYSTEM."

TECHNICAL FIELD OF THE INVENTION

This invention relates in general to computing and display systems, and more particularly to a system and method for integrating internet protocol into digital display systems.

OVERVIEW

Internet protocol television (IPTV) can deliver dozens of channels of video programming through a relatively low-speed broadband connection. IPTV reduces the bandwidth by sending the channels requested by the user, rather than broadcasting everything as is done in conventional television systems. Consequently, IPTV could enable the delivery of video over copper networks, thereby permitting telephone carriers to provide voice, video, and data-triple play.

However, conventional IPTV implements a number of subsystem boxes that increase probability of errors within the signal and dropped channels. Namely, the input first comes from a fiber or wired connection from the carrier. The signal is then coupled to a router. The output of the router is connected to a set-top box. In some cases, the set-top box is coupled to an external hard drive. Finally, the set-top box sends an output to a television set.

SUMMARY OF EXAMPLE EMBODIMENTS

In one embodiment, a digital display system comprises an electronic processor that is operable to receive an internet protocol video packet and to generate a control signal based at least in part on the internet protocol video packet. The digital display system also comprises one or more light sources capable of generating one or more optical signals and one or more light modulating chips. The one or more light modulating chips are operable to receive the one or more optical signals and to modulate the one or more optical signals based at least in part on the control signal. The digital display system further comprises one or more display screens operable to receive the modulated signals communicated from the light modulating chips.

Depending on the specific features implemented, particular embodiments of the present invention may exhibit some, none, or all of the following technical advantages. Various embodiments may be capable of reducing the size and complexity of digital display systems. Some embodiments may be capable of reducing the amount of analog to digital and digital to analog conversion. Some embodiments also may be able to reduce the latency introduced by electronic processing in the system.

Other technical advantages will be readily apparent to one skilled in the art from the following FIGURES, description and claims. Moreover, while specific advantages have been enumerated, various embodiments may include all, some or none of the enumerated advantages.

BRIEF DESCRIPTION OF THE DRAWINGS

For a more complete understanding of the present invention, and for further features and advantages thereof, reference is now made to the following description taken in conjunction with the accompanying drawings, in which:

FIG. 5 is a block diagram of an optical digital display unit;

DETAILED DESCRIPTION OF EXAMPLE EMBODIMENTS

Figure 1:
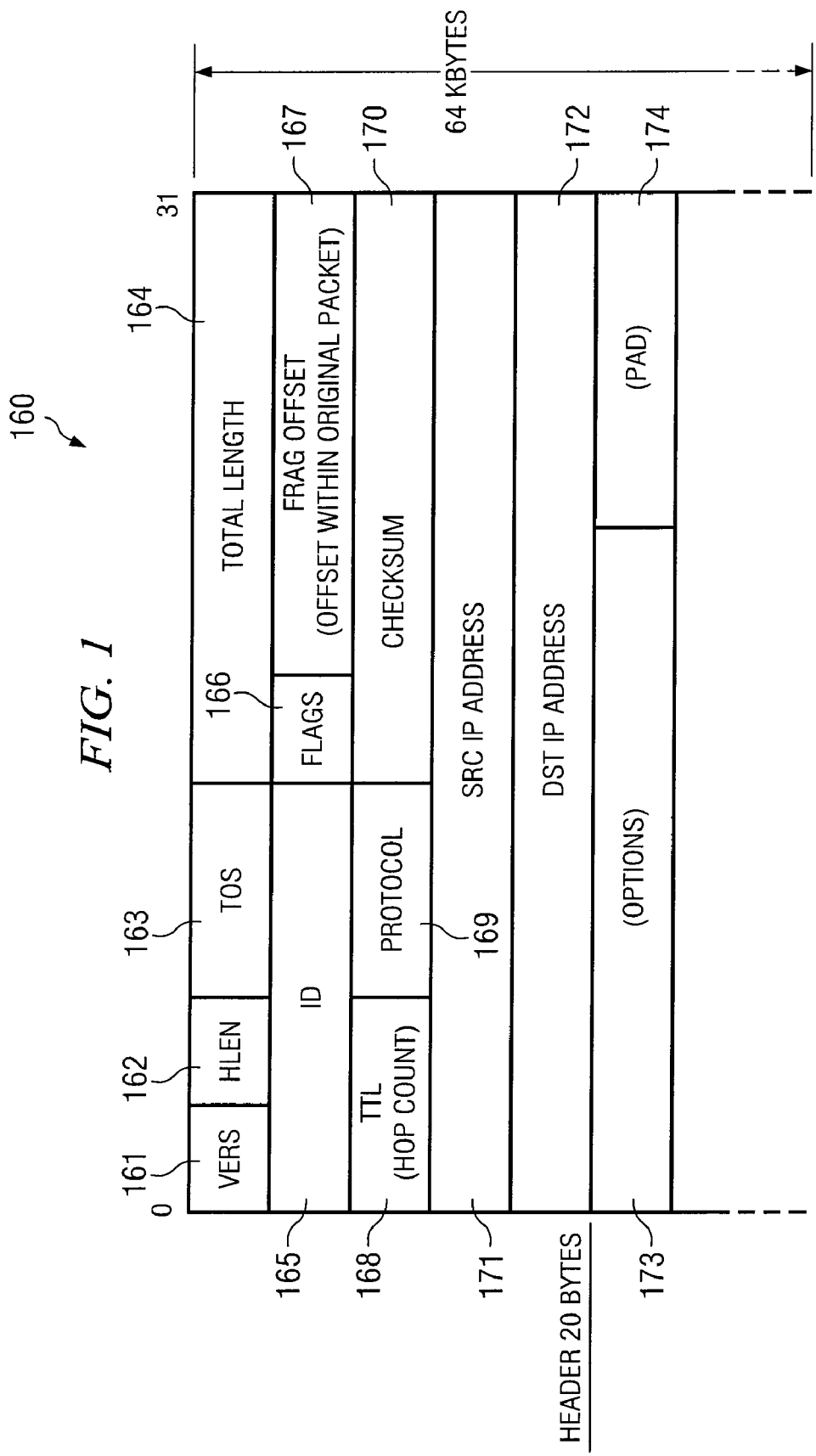
FIG. 1 is an example of an internet protocol datagram or packet.

This disclosure describes an integrated digital display system capable of supporting at least IPTV and that can directly or indirectly connect to the signal received from the telephone, cable, satellite, or other television carrier. In various embodiments, the system advantageously includes fewer—when compared to conventional IPTV systems, which can reduce the complexity of set-up and interconnection for the user. In other embodiments, the system can advantageously reduce the cost and size of the display system by integrating one or more of the router, set-top box, external hard drive, and television or display into an integrated display system.

The signal received by conventional IPTV display systems is typically converted between multiple formats (e.g., digital to analog, etc.). In some cases, the integrated digital display system disclosed herein can advantageously reduce the number of signal format conversion and, therefore, can improve the fidelity of the display because there is reduction in the amount of loss relating to the quality of the signal. In addition, the performance can be improved, because there is less latency from passing through the multiple boxes and the various conversions. This reduction in latency is important for real-time programming (e.g., sports or interactive settings) as well as for some normal functions like channel-surfing (e.g., changing rapidly through a number of channels).

Moreover, the display system can also be simplified and reduced in cost. For example, multiple tuners used in standard television sets for implementing functions like picture-in-picture (PIP) may no longer be required. Since the input signal is digital, and in many cases the display technology can be digital, the digital signal can be coupled to the digital optical devices for the highest, fastest performance. Finally, unlike conventional display systems, the integrated digital display system will need to accommodate only a few to tens of megahertz of data, rather than approximately 550 MHz accommodated by conventional television systems. This reduced bandwidth can reduce the cost of the electronics.

Conventional television service typically includes an analog signal delivered in a continuous data stream, which is usually a radio frequency (RF) signal. A standard television channel occupies approximately a 6 MHz bandwidth if it is uncompressed, whereas an uncompressed high-definition television (HDTV) channel occupies approximately 30 MHz bandwidth. In a conventional television system or set, all channels are broadcast to the television set, and then a filter is used to select the appropriate channel. For example, over a cable system the typical signal having approximately a 550 MHz bandwidth includes enough of a spectrum for up to 91 channels of standard definition programming. The user watching one standard channel uses a tuner to select a 6 MHz part of this bandwidth, and the remaining 544 MHz is unused by the set-top box or television tuner.

On the other hand, IPTV is different because it is typically received in a digital format and is typically delivered in packets of data. In most cases, IPTV typically relies on the internet protocol (IP) format to deliver video and/or other data services, in many cases the IP packets or other data packets being communicated over an Ethernet network. With IPTV the content is typically a digital format, the communication is typically in a digital format, and the communication is typically at a baseband frequency. In some cases, the digital communication technology can be lower in cost and can tolerate much lower signal levels (e.g., can tolerate a reduced signal-to-noise ratio).

IPTV, as it applies to the service provider, typically consists of at least two services. The first service is video on demand, where each television has its own unique stream of IP packets, also known as IP unicast. A second service is switched digital video, where one stream of IP packets is allocated per video channel and it is shared by multiple televisions, also known as IP multicast. In most cases, these two technologies can be complimentary, and many other types of services can also permissible.

IPTV can enable the delivery of many channels of television over relatively small bandwidth communication links or pipes, such as, for example, a digital subscriber loop (DSL), fiber to the home (FTTx), and/or other type of communication pipe. In some cases, with respect to IPTV, only the channel being requested or viewed by the user is typically communicated to the home. In other words, the other available channels that are not being requested or watched are not communicated to the home. Moreover, better compression technologies, such as Windows Media 9 or MPEG-4 (Moving Picture Experts Group) provide, for example, approximately three times as efficient compression as MPEG-2.

This disclosure describes a packet-based, digital display system. In the following a digital display system is described that primarily uses IP packet inputs. It should be noted that the disclosure could also be combined with a display system that also uses the traditional analog or radio frequency tuner signals (e.g., a hybrid system). There are several reasons for this. First, the hybrid packet and conventional display system then would be backward compatible with legacy broadcast and cable systems. Second, an intermediate form of IPTV may be used where certain services such as video-on-demand rely on packet delivery while standard, broadcast television stations are provided in the more conventional signal. In this case the packet based display system would handle the special services, such as video-on-demand, while the more conventional tuner would handle the standard, broadcast television stations.

Another aspect of using packet-based delivery of signals to a digital display system is that the system can be two-way interactive. In addition, the packet-based delivery system can unicast as well as broadcast signals, and can statistically multiplex a number of channels or data streams. One consequence of these aspects of packet-based displays is that the content can be customized to the user. As one particular example, the paradigm of broadcast advertising can be completely changed to individualized, highly-effective advertising. Rather than advertising being a one size fits all, the interactivity of the packet-based display system can be used to provide advertising content of interest to the user or audience. For instance, based on the history of shows watched, channels surfed, emails sent, user preferences selected, demographics and time of the user, etc., the advertisements can be customized to the audience and made more effective. In other words, instead of broadcasting the same advertisement to everyone, customized advertisements can be unicast to each user through a packet-based display delivery system.

Beyond customizing and increasing the effectiveness of advertisements, suggestive advertisements or items of interest can also be added along one or more edges of the display system. The user or audience can then click on or select the advertisement to obtain more detail, if the topic is of interest. As before, the side topics or advertisements can be based on the history of shows watched, channels surfed, demographics zip code, etc., and the advertisements can be statistically multiplexed with the display data being presented. The model for payment can also be that the advertiser only pays for the items or advertisements that the user clicks on. Since the viewing experience and the content of the display are much more customized to the user, it may also be advantageous to have a "login" type system, where a particular user logins in so that his or her preferences can be loaded. In order to customize the content, it may also be advantageous for the content managers to place "cookies" on the hard drive or other location within the digital display system.

Thus, the packet-based display systems can create a significantly enhanced viewing experience for the users and advertisers. From the users' standpoint, the content of the display is much more relevant to their interest and needs. From the advertisers viewpoint, the can sell their products more effectively rather than using a "one-size-fits-all" approach. Moreover, the economics for the advertisers can be improved by paying only when the user clicks on the advertisement, if it is to the side of the display. The aspects of the packet display that permits these features includes the statistical multiplexing, the bi-directional interactive information exchange, and the ability to communicate history, cookies, etc.

The packet-based display system can also enable other paradigms of customized viewing. As one example, the digital display system can incorporate a number of sensors to monitor the users. For instance, sensors can monitor the number of viewers, the eye content of the users, whether they are eating while watching, etc. This sensor data can be statistically multiplexed to the upstream data signal being sent from the digital display system. Then, the advertisers can use the sensor data to customize the advertisements being unicast or to adjust the content being displayed in the show. Even the shows being watched might be changed—i.e., the amount of action, the ending, etc.—based on the sensor data.

A rear projection display system is disclosed that receives video signals in digital form, such as, for example, by internet protocol (IP) packets. The use of IP packets, or any other packet based protocol, permits the statistical multiplexing of a number of video channels, as well as the multiplexing of those video channels with voice and data. In some cases, statistical multiplexing can allow more efficient use of the bandwidth, or alternatively the use of a smaller bandwidth to transmit the same amount of information. In a preferred embodiment, the coupling of a digital signal in packet form to an all-digital display system can minimize unnecessary analog-to-digital and digital-to-analog conversions, along with the associated loss and sampling error. Such an all-digital display system may be capable of providing a high clarity display with a very high signal-to-noise ratio. Furthermore, the feeding of digital packet signals directly to a digital display system reduces the complexity, size, number of boxes and the cost of the display system.

Rear projection display systems are attractive because they can illuminate a large display screen at relatively low cost and with relatively low weight. Conventional rear projection display systems receive mostly analog and perhaps a few digital channels, but each of these channels are in at fixed radio frequency band and transmitted in a continuous fashion. Examples of rear projection display systems include liquid crystal display (LCD), liquid-crystal on silicon (LCOS), and digital micro-mirror devices. The tuner in the display receiver selects the channel of interest, and the remaining channels are blocked (e.g., most of the bandwidth goes unused). Thus, conventional rear projection systems waste a significant fraction of the bandwidth. Moreover, if multiple channels are to be displayed, such as picture-in-picture (PIP) a plurality of receivers are typically required.

One aspect of this disclosure is to provide a more efficient use of the bandwidth used by rear projection display systems. Another aspect of this disclosure is to create a high fidelity digital display system by avoiding unnecessary steps between the digital packet input and the drivers to digital rear projection displays. Yet another aspect of this disclosure is to reduce the cost and complexity of digital display systems by reducing the number of boxes and/or components, and eliminating the need for multiple receivers.

In one embodiment, a rear projection display system is described where the video data input is received in packet format. A preferred embodiment uses a digital display system, and yet another preferred embodiment uses internet protocol packet format. The use of packets permits statistical multiplexing of a number of channels, thereby reducing the input bandwidth requirements. With the reduced bandwidth requirements, the video channels can be fed to users through networks such as fiber-to-the-home or fiber-to-the-curb (FTTx), hybrid fiber coax, DSL, and other broadband delivery methods. Packet based delivery can be more efficient than standard video delivery methods because multiple channels can be multiplexed over the same bandwidth. Furthermore, the video channels can be multiplexed with other types of signals, such as voice or data, thereby permitting the so-called triple play. Moreover, when each channel is broadcast on one band or radio frequency, then the frequency is set aside, regardless of whether anything is being sent or whether the user is watching that channel. On the other hand, by using packet multiplexing, a more uniform usage of the bandwidth is possible without wasting a lot of bandwidth.

In addition, the rear projection display systems described herein can display a number of "windows" simultaneously without using multiple receivers. Just like in a computer, there can be a number of processes running, and the statistically multiplexed packets can be demultiplexed to the various processes operating. Unlike PIP displays today that rely on using multiple receivers, the cost of the multiple window packet-based display can reduce the cost of the display system. Also, since the processing capacity increases roughly as Moore's law (i.e., doubling roughly every 18 months), the packet based display systems can ride Moore's law to reduce in cost or offer more capability with time.

The rear projection display system disclosed herein also advantageously and economically permits large display areas, typically with screen sizes diagonally of more than 46 inches. The packet based display system can exploit the large screen size to display multiple windows with a variety of information and entertainment services. At least some part of the screen can display entertainment services like movies, television, video-on-demand, etc. Other parts of the screen can display data services, such as email or internet access. Yet further parts of the screen can display voice related services, such as caller IDs, incoming calls, voice mail, etc. These multiple windows can be displayed simultaneously, or a remote control, keyboard, mouse, or joystick can be used to navigate between some or all the windows. It should be noted that the rear projection display systems, which can be based on LCD, LCOS, or digital micro-mirror devices, are to be distinguished from the typical flat panel, slower LCD typically used for computer displays. In particular, the rear projection displays typically have much higher speeds (permitting significant motion without blurring of the image—for example, a football flying to the end zone and being caught by a jumping player) than computer displays. Also, rear projection displays are typically brighter, have higher contrast ratio, and have better and crisper colors than computer terminals. This is because rear projection displays are typically built for entertainment, while computer displays are usually built for text and other static images.

Compared with conventional display systems, the packet based display system disclosed herein can be smaller, simpler, more cost effective and have a higher fidelity. By using a digital packet data input to drive a digital display system, unnecessary analog-to-digital and digital-to-analog conversion steps can be eliminated or minimized. Each A/D or D/A step introduces loss, sampling errors and latency. Therefore, reducing the number of conversion steps increases the fidelity of the signal displayed on the screen. In other words, the packet based display system can have a higher signal-to-noise ratio. Moreover, conventional display systems require the interconnection of a number of boxes to handle packet based video inputs. For example, the incoming line is typically connected to a router, which is coupled to a set-top box, which is in turn coupled to a display system. In between, the signal may go from digital to analog back to digital, errors may be made in connecting the different boxes, and there can be poor interoperability between routers from one company, set-top boxes from another company, and displays from yet another company. Moreover, the software can be incompatible between the different units. By having the packet based video input connected directly to the digital display system, few boxes are required, the interoperability problems can be minimized, and less space can be used.

If the display technology is also digital, then an all-digital display system can be implemented. As an example, displays based on digital micro-mirror devices are digital display systems (i.e., systems with binary state, each pixel being on or off at any given moment). If the packet based, or IP based digital input is used to drive the digital display system, then the sharpest image with highest signal-to-noise ratio can be achieved. All-digital systems have higher fidelity because digital systems are regenerative, whereas analog systems accumulate noise. In other words, in a digital system the ones and zeros are repetitively reset, while in analog systems the same signal propagates through, decreasing in signal-to-noise ratio as each element is passed. Moreover, A/D and D/A conversion processes have sampling errors and noise introduced at each step, while an all-digital system can avoid these distortions of the signal.

IP Packet Format

A display system that is fully compatible with IPTV signals from the telecommunications service provider or a cable company should be able to directly or indirectly receive and process IP packets. An IP packet has a header and a payload, with a maximum size of each packet typically of 64 kilobytes (1 byte being 8 bits). As an example, FIG. 1 shows an IP packet 160 with details of the header. In IP version 4 (IPv4) the header is typically 20 Bytes long, while in IP version 6 (IPv6) the header is typically 40 Bytes long. These values are representative, but any other size of header and packet size would be compatible with the disclosure. Of the items in the header, one element is the destination address 172 (DST IP Address). This provides the address to which the packet is intended. As a non-limiting example, this can be address of a particular user, it can be address corresponding to a particular video channel, or it could be the address of a multi-cast of a particular video channel.

In this particular embodiment, IP datagram 160 comprises the following information. As shown in FIG. 1, each row corresponds to 32 bits or 4 bytes. Starting on the first line, there is a version 161, header length 162, time of service 163 and total packet length 164. On the second line there is fragment identification 165, various flags 166, and a fragment offset 167, which is the offset within the original packet. The third line has the hop count or time to live 168, the packet protocol 169, and a header checksum 170. The next line has the source IP address 171, while the following line has the destination IP address 172. Then, the last line of the header has any options 173 as well as padding 174. For IPv4, this total header is 20 bytes long, while in IPv6 this header is 40 bytes long.

Header Processing Unit

Figure 2:
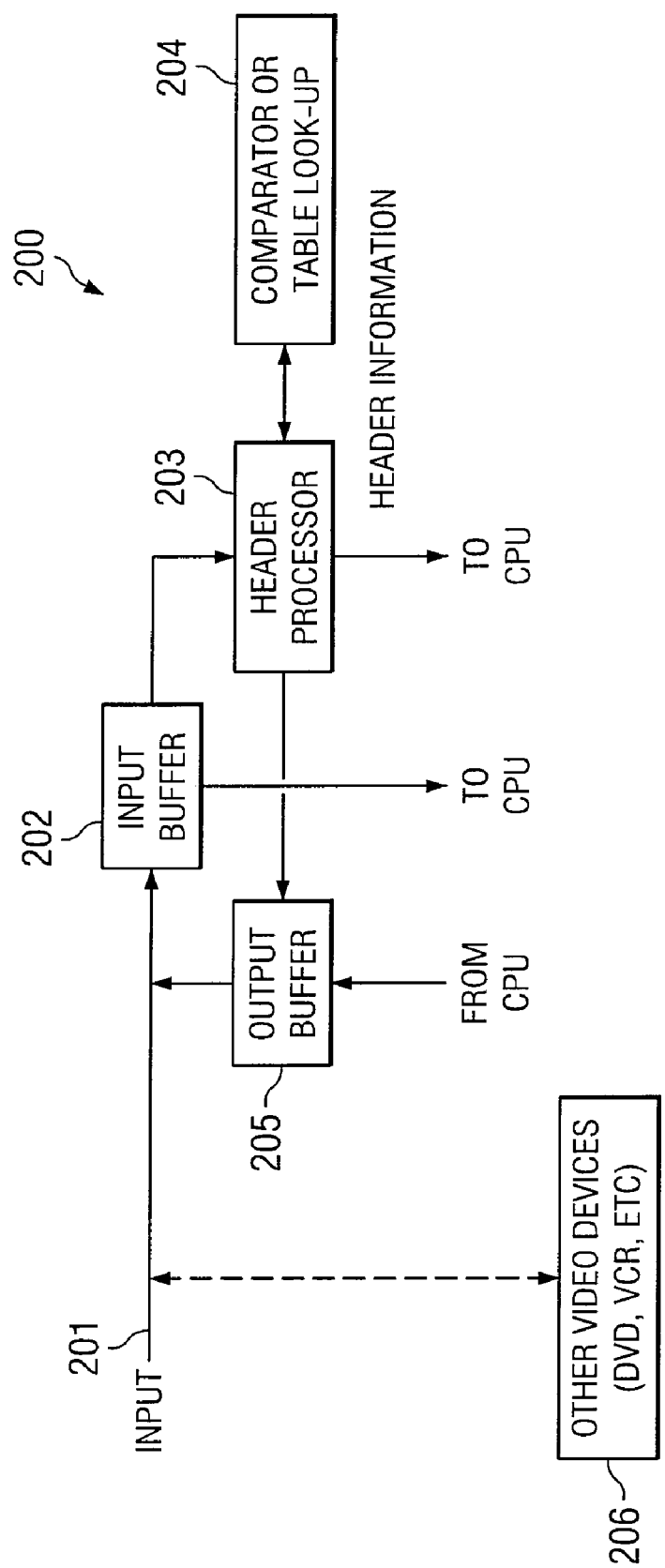
FIG. 2 is a block diagram of a header processor unit.

The display system should advantageously have a header processing system for processing a header of an IP packet or other types of packets received at the system. FIG. 2 illustrates one example of a header processor 200 that can be used with a display system. The IP data input 201 is received from a fiber, a coaxial cable, a copper twisted-pair wire, or a wireless connection. In addition, the input line could be coupled to other video devices 206, which can comprise, for example, digital video discs (DVD) players, VCR's, TiVo, time shifting devices, space shifting devices, or other devices. The DVD can be of standard format, HD-DVD format or Blu-ray DVD format. This input can advantageously be loaded into an input buffer 202. The signal from the input buffer 202 is coupled to a header processor 203, which exemplary can be an electronic processor that looks at the header in the packet to determine its nature or destination. As one example, the destination address of the packet can be examined. The address can be compared with the local node address using a comparator 204. One example of a comparator is an XOR-gate based device. Another exemplary addressing scheme is to compare the destination address using a table look-up within comparator 204. There may also be bits of the header that indicates if the packet is IP uni-cast or an IP multi-cast. In one example, if the header matches something of interest for the local node, then the packet can be downloaded for further processing. If the header is not of interest to the local node, the packets can either be dropped or returned to the network. The header processor 203 may also be coupled to an output buffer 205, if the header processor needs to send a signal upstream. In addition, at least one output of the header processor will be coupled to the central processor unit (CPU) electronic processor.

CPU Electronic Processor Unit

Figure 3:
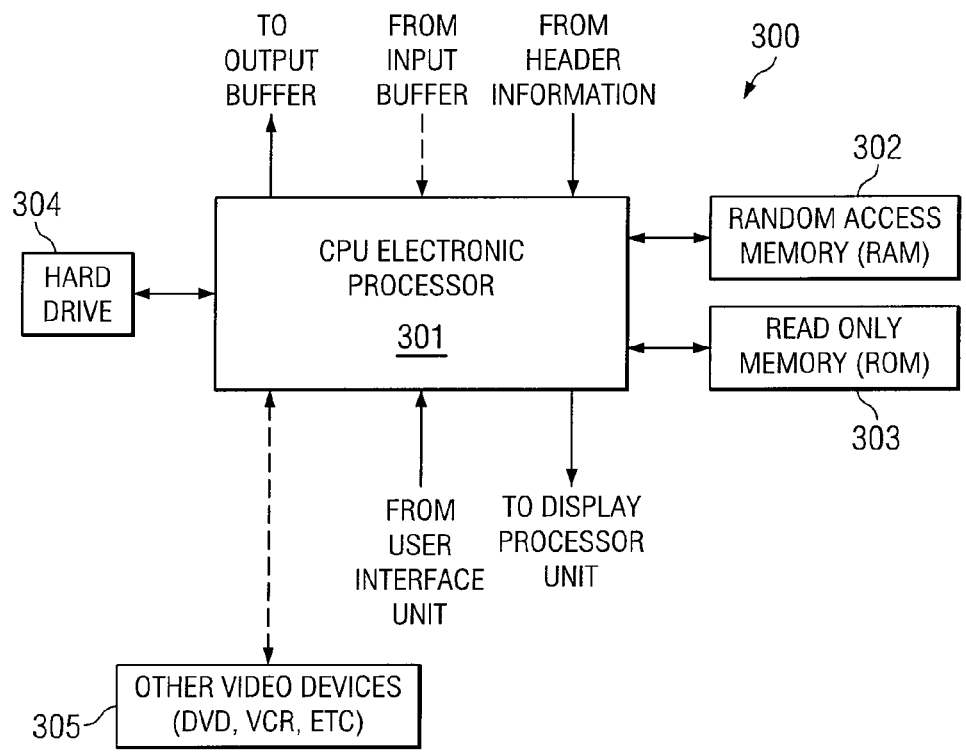
FIG. 3 is a block diagram of a CPU electronic processor unit.

The CPU electronic processor 300 performs a number of functions to prepare the packet data for the display processor. As illustrated in FIG. 3, the CPU electronic processor 301 is coupled to random access memory (RAM) 302, read only memory (ROM) 303 as well as a hard drive unit 304. In addition, the CPU electronic processor 301 could be coupled to other video devices 305, which can comprise, for example, DVD players, VCR's, TiVo, time shifting devices, space shifting devices, or any other desired device. The DVD can be of standard format, HD-DVD format or Blu-ray DVD format. In some embodiments, the hard drive 304 may be capable of storing one or more programs for time shifting or later viewing, as is done either by VCR's or TiVo systems. In this particular embodiment, the CPU electronic processor 301 is coupled to the header processing unit 200, where it receives at least some control data related to the addressing. The CPU electronic processor 301 is also coupled to the output buffer 205 and probably also to the input buffer 202. The RAM 302 and ROM 303 memories can at least in part fulfill some of the functions of the input 202 and output buffer 205.

CPU electronic processor 301 may be capable of decompressing the incoming data. In some cases, electronic processor 301 can decompress incoming data in having an MPEG-2 compression format. In other cases, electronic processor 301 can decompress incoming data having an MPEG-4, Windows Media 9, or other compression format. Although some particular compression formats are described, any other compression scheme can be used with the disclosure. The CPU electronic processor 301 will decompress the incoming data using algorithms and technology appropriate for the particular compression scheme employed in the data.

In other embodiments, CPU electronic processor 301 and associated memory or buffer may be capable of reordering packets and to making the data flow continuously. For example, IP is a connectionless oriented technique, meaning that packets can be mis-sequenced. For example, if a large video is being transmitted, it is first broken up into a number of IP packets, and then the packets are transmitted one-by-one. However, in the IP network each packet is individually routed, and some packets may even be lost. Since different packets can take different paths, they may not arrive at the local node in the order that they were sent. Therefore, the incoming packets need to be buffered, and based on a sequence number contained in the packet they need to be re-ordered into the order that they were originally sent.

Since IP packets are sent bursty and with statistical multiplexing with other data, another function of the CPU electronic processor 301 and associated buffers 302 and 303 is to take the irregular arriving packets and, after reordering, stream them out in a more continuous nature to the display driver. Any packet to packet jitter in the resulting output stream should be made shorter in time than the human eye, ear or brain can perceive. As an example, the packet-to-packet jitter may be 200 msec or less.

CPU 301 may also be capable of recording for time-shifted viewing one or more particular input signals. Just as in a VCR or TiVo unit, the user can command recording of a video program for time-shifted viewing. The CPU electronic processor 301 will then take the command and send the appropriate video packet stream to a storage unit such as the hard drive 304 for later viewing.

In other embodiments, CPU 301 may be capable of receiving or generating outgoing data, process the data into IP datagrams and send to the output buffer 205 for transmission. For example, the display system may include external data entry devices, such as remote controls, screen commands, voice commands, external keyboards or joysticks, writing tablets, or any other appropriate device. There may also be a standard set of functions that are also available to the user, such as video on demand or pay-per-view, changing channels, check for voice or email messages, etc. The CPU electronic processor 301 may process the data received into IP packets, which are then buffered in the output buffer 304 for transmission upstream to the network 201.

CPU electronic processor 301 may also be capable of preparing the data into formats appropriate for driving the display chips or devices. The display technology may include micro-mirror devices, liquid-crystal on silicon devices, liquid crystal devices, plasma devices, or cathode ray tubes (CRT). Each of these types of devices may require the data formatted in a particular fashion, which can at least in part be performed by the CPU electronic processor 301. In some cases, CPU 301 cab communicate a signal to a display processor unit, such as, for example, display processor unit 400 of FIG. 4 that operates to process the data into the display device specific format.

Display Processor Unit

Figure 4:
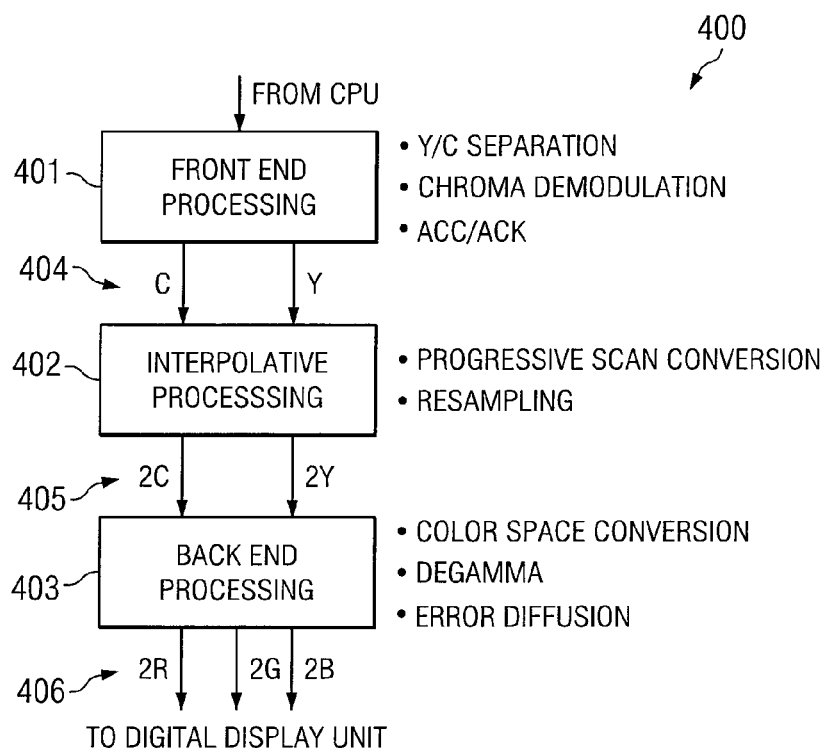
FIG. 4 is a block diagram of a display processor unit.

As one example, display processor unit 400 can comprise any digital processing micro-mirror device, such as, for example, a digital light processing (DLP™) device of Texas Instruments. FIG. 4 shows the video processing functional block diagram of a digital processing micro-mirror device. In the front-end processing 401, the input signal is subjected to Y/C separation and chroma demodulation. Additional operations include Automatic Chroma Control (ACC) and Automatic Color Killer (ACK).

Digital Y/C data 404 is output from the front-end processor 401, and the output is subjected to Interpolative processing 402. In this process the data undergoes interlace to progressive scan conversion, re-sampling, and picture enhancements. Picture enhancements include luminance and chrominance sharpening and noise reduction.

The enhanced, progressively scanned Y/C data 405 is then passed through a color space conversion in the back-end processing 403 to obtain RGB data 406. This data is subjected to a degamma operation to remove the gamma imposed on the signal at transmission. During the degamma operation, error diffusion can be used as a means of subjectively improving the nonlinear digital remapping process. The linearized, progressive RGB data 406 is then reformatted into bit plan level data that is used to drive the digital processing micro-mirror device using a pulse width modulation technique.

The electronics associated with performing these various functions may include memory, application specific integrated circuits (ASIC), FPGA, signal decoders, programmable timing controllers, and scanned video processors (SVP). Although one example of the display processor unit function has been described, many other techniques can be used within the scope of the disclosure.

The output from the display processor unit can then be sent to the digital display unit 500 of FIG. 5. Digital display unit 500 includes the physical hardware that generates the image on the screen that is viewed by the user. Two parts of the hardware are the cabinet and screen (outside physical unit) and the optical engine that generates the optical image. Another important part of the hardware is the electronics for driving and data processing.

In some embodiments, a user interface unit can be coupled to the digital display unit 500. The user interface can comprise a number of individual devices to enable the user to communicate with the digital display system. For example, there may be remote control, a keyboard, a joystick, a mouse, a tablet interface, a voice controlled interface, a button panel on the face of the display, or any other type of user inputting devices. The user interface unit may be used to control the display unit device directly, or to send upstream data, commands, or requests back to the network.

Optical Digital Display Unit

There are a number of architectures and technologies that may be used for the optical digital display unit. The basic technologies for displays include digital micro-mirror, LCOS, LCD, Plasma and CRT. As non-limiting examples, details of the micro-mirror based digital display unit, a LCOS digital display unit, and a LCD based digital display unit will be described below. All of the configurations described fall in the category of rear projection light systems. However, this is just one example, and other types of projection systems can also be used.

FIG. 5 shows one example of a block diagram of the optical digital display unit 500. In this example, light source 501 operates to generate a constant stream of light without modulation. Light source 501 can comprise, for example, one or more lamps, bright light bulbs, light-emitting-diodes (LEDs), lasers, or any other light emitting device. Examples of lamps include xenon lamps, arc lamps, halogen lamps, and examples of lasers include solid state lasers and semiconductor laser diodes. In some embodiments, light source 501 can operate to provide light in the visible wavelength range (e.g., approximately 400 nm to 800 nm). In most cases, light source 501 can be located in the digital display cabinet, so that it can be replaced periodically.

In this particular embodiment, light source 501 emits light in the visible as well as in the infrared (IR) (e.g., wavelengths longer than 800 nm) and ultraviolet (UV) (e.g., wavelengths shorter than 400 nm). A UV/IR filter 502, which can comprise one or more elements, can be coupled to the light source 501 to filter the unwanted wavelengths of light. In some cases, IR light can unnecessarily generate heat in the light engine. In other cases, UV light can cause degradation of plastic and glass elements used in the light engine. The UV/IR filter 502 can comprise dichroic mirrors, dielectric mirrors, dielectric coatings on a substrate, absorptive filters, reflective filters and beam splitters. In some cases, the UV/IR filter 502 can be integrated with the enclosure around the light source 501.

Another problem with the light source 501 is that it may have filaments or other non-uniformities. A light pipe integrator 503 can be used to smooth the light so it uniformly illuminates the pixels on the digital micro-mirror device, such as, for example, a spatial light modulator. Light pipe integrated 503 can comprise, for example, multi-spatial mode light pipes, multi-mode fibers, one or more lenslet arrays, solid or hollow light tubes and waveguides. Although FIG. 5 illustrates the light pipe integrator 503 following the UV/IR filter 502 and before the color demultiplexer 504, these components as well as other components in FIG. 5 can be in different order or position.

A color demultiplexer 504 is used to separate the white light into the three primary visible wavelength bands around blue, green and red. The color separation can be sequentially in time, color separation in space, or a combination of the two.

Color demultiplexers 504 can comprise, for example, one or more color wheels, color discs, one or more dichroic filters and mirrors, and one or more fixed or tunable filters.

One or more lens and mirror light directing optics 505 can be used to direct the light from light source 501 to the light modulating chips 506. The directing optics 505 may collimate or focus the light beams and should lead to imaging of the light substantially uniformly over the light modulating chips 506. The directing optics 505 can comprise lenses, mirrors, beam splitters, prisms, or other optical elements. Although FIG. 5 shows the light directing optics 505 as one module, the directing optics can be intermingled with the other components such as 501, 502, 503 and 504.

The light modulating chips 506 can be analog or digital. Examples of analog chips include LCOS, LCD, and some versions of micro-mirror devices, such as spatial light modulators that move ribbons of micro-electro-mechanical system (MEMS) devices up and down. Examples of digital chips include micro-mirror devices such as variable blazed gratings, digital light processing devices, and/or digital micro-mirror devices. Some light modulating chips 506 operate in reflection, such as LCOS and micro-mirror, while other light modulating chips 506 operate in transmission, such as LCD. The light modulating chips 506 can comprise an array of elements, each element forming one or more pixels of light. Examples of sizes of the arrays of modulating arrays include 1280×720 (so-called 720p), 1920×1080 (so-called 1080p) and 960×1080. However, other sizes of arrays of modulating elements can also be used within the scope of the disclosure.

In some embodiments the light modulating chips 506 can comprise a second moving mirror positioned separately from the chip. The second moving mirror wobbles periodically at a certain frequency, such as 60 Hz or 120 Hz or other multiples of 60 Hz. This is an exemplary frequency, but other frequencies can also be used. The purpose of the wobbling mirror is to create several pixels of light incident on one of the modulating elements at spatial angles, which in turn get modulated into different angles. By the use of such a wobbling mirror, the number of modulating elements can be fewer than the number of pixels desired on the output. For example, by using a wobbling mirror with two beams directed to one or more of the modulating pixels, a 1920×1080 pixel image can be created using a chip with 960×1080 pixels. Other numbers are also consistent with the disclosure.

The one or more light modulating chips 506 receive electronic control signals from the display processor unit through input 512. In addition, the light modulating chips 506 can be coupled to a bias circuits and power supplies 511. The modulating elements in the light modulating chips 506 can either be accessed each pixel individually, or another configuration may be to access the chip a row or column at a time. Different accessing schemes can be used consistent with the disclosure.

One important feature of the light modulating chips 506 is to achieve a high contrast ratio at the screen 510. The contrast ratio is determined in part by how black the off state of the light can be. One way of increasing the contrast is to block light carefully that is in the off state using an appropriate beam block. Another way of increasing the contrast is to place dark-metal or anti-reflection coatings on the substrate and other parts to minimize stray reflections.

The modulated light from the light modulated chips 506 is collected for display using collection optics 507. Collection optics can comprise one or more prisms, mirrors, and/or lenses. The collected light is coupled to a projection lens 508 to expand the beam for projection onto the screen. For a rear projection configuration, a back reflector 509 directs the projected light to the screen 510. The back reflector 509 can comprise one or more mirrors, which can be flat or curved. The screen 510 can comprise, for example, a size from 42 inches to 81 inches or more.

Although the collection optics 507 and projection lens 508 are illustrated as separate modules, they can share some of the optical elements or overlap in the same module. Also, some of the elements of the directing optics 505 may be in common with the collection optics 507. Furthermore, although a particular coupling between elements is shown in FIG. 5, the order of the components and their relative positions can be moved around. Furthermore, the digital display unit 500 may comprise only some of the elements of FIG. 5, or the digital display unit 500 may have other elements that are not indicated in FIG. 5.

Figure 6A:
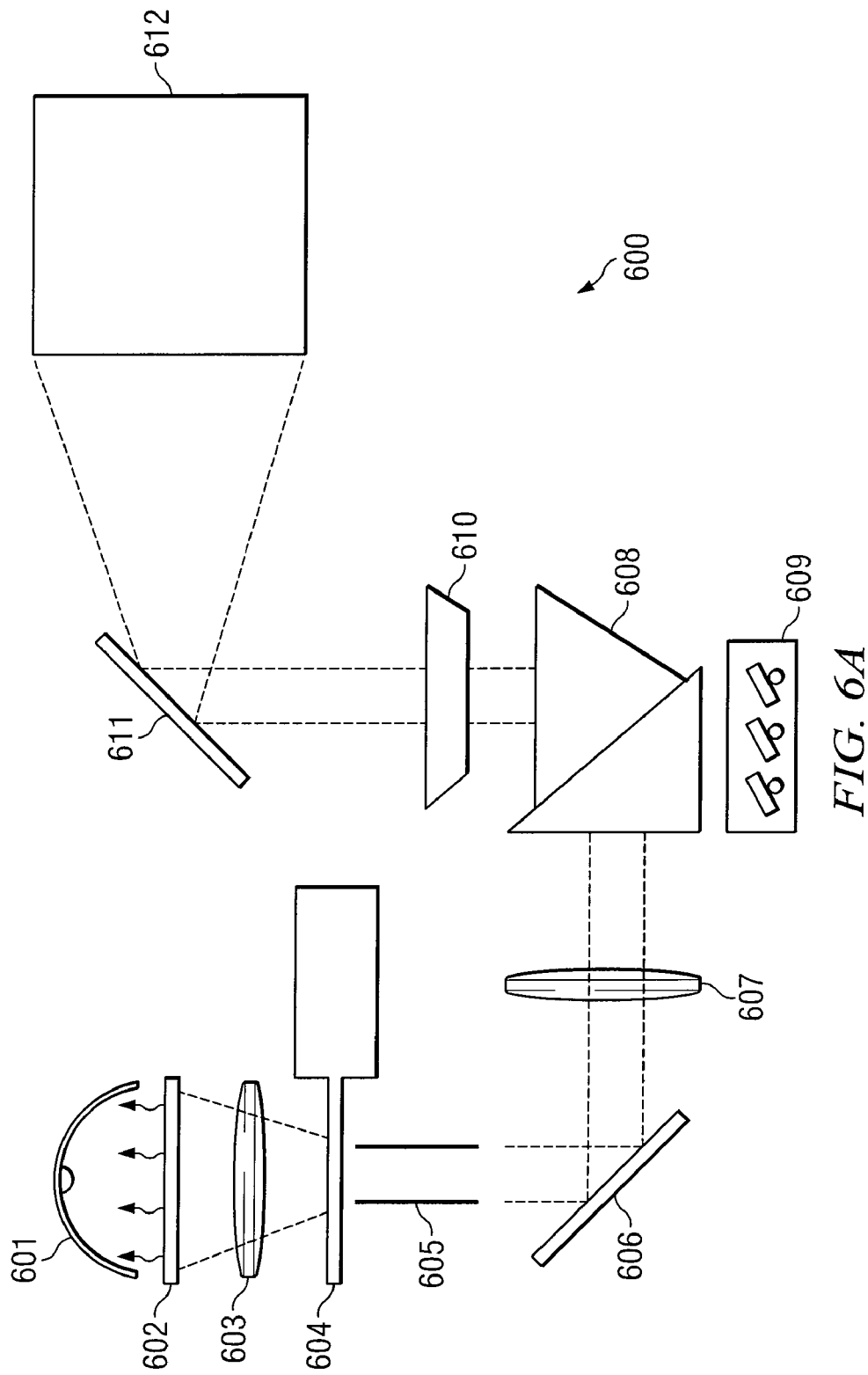
FIG. 6A is a diagram of a light processing engine based on micro-mirror devices or digital light processing.

Several particular embodiments of the optical digital display unit are illustrated in FIG. 6. These are non-limiting examples, and other configurations can be used within the scope of the disclosure. One example of micro-mirror digital optical display unit is shown in FIG. 6a. The light source 601 is coupled to a UV/IR filter 602, a color wheel 604, and a light pipe integrator 605. The light directing optics can comprise lenses 603 and 607 as well as mirrors 606 and prisms 608. The micro-mirror light modulating chip 609 is located below the prism 608. The chip 609 modulates the light in reflection, and the reflected light is collected through the prism 608. Therefore, the collection optics comprises the prism 608. The modulated light beam is expanded using a projection lens 610, which is then reflected off a back reflector 611 to the screen 612. The configuration of FIG. 6A is merely one example, and different configurations with some or all the components and with the same or different order can be used in the optical digital display unit.

In one embodiment of a micro-mirror optical digital display unit 600, at least one of the mirrors between the light source 601 and the micro-mirror chip 609 can be wobbled. As one example, the mirror 606 can be rocked or wobbled back and forth at a frequency, which can exemplary be 60 Hz or 120 Hz. By moving the mirror 606, two or more pixels that are spatially separated can be modulated by the same micro-mirror device. Hence, the number of elements in the micro-mirror chip 609 can be fewer than the number of pixels in the display image. Although in this example mirror 606 is wobbled, there can be additional mirrors included between the light source 601 and micro-mirror chip 609, one or more of the mirrors capable of being wobbled. Furthermore, in another embodiment a mirror between the micro-mirror chip 609 and the screen 612 can also be wobbled.

To increase the contrast of the display (e.g., the blackness of the off state) a number of techniques can be applied to the digital display system of FIG. 6a. For example, apertures or beam blocks can be used after the micro-mirror chip 609 and before the screen 612 to block unwanted light. In a preferred embodiment, the apertures or beam blocks can be placed between the micro-mirror chip 609 and the projection lens 610. Another technique is to place a coating or a so-called dark metal layer above the substrate of the micro-mirror chip 609 to minimize stray light from reflecting from the one or layers above the substrate but below the micro-mirror. Yet another technique to increase contrast is to increase the rotation of the micro-mirrors on the chip to deflect or spatially separate the off-state further. In one example, the micro-mirrors can rotate 10 degrees or more from the normal to the substrate, while in another example the micro-mirrors can rotate 12 degrees or more from the normal to the substrate.

In yet another embodiment for increasing the performance of the micro-mirror chip 609, the size of the micro-mirrors can be reduced. In one non-limiting example, the mirrors can be 17 microns or less pitch, in another example 14 microns or less pitch, and in yet another example 10 microns or less pitch. In a further embodiment for increasing the performance of the micro-mirror chip 609, the shape and orientation of the micro-mirrors can be optimized. For example, in some display systems it may be advantageous to use diamond shaped micro-mirrors rather than square or rectangular shaped micro-mirrors. Although several examples of micro-mirror device improvements have been described, other designs and implementations can be used in the optical digital display unit 600.

Figure 6B:
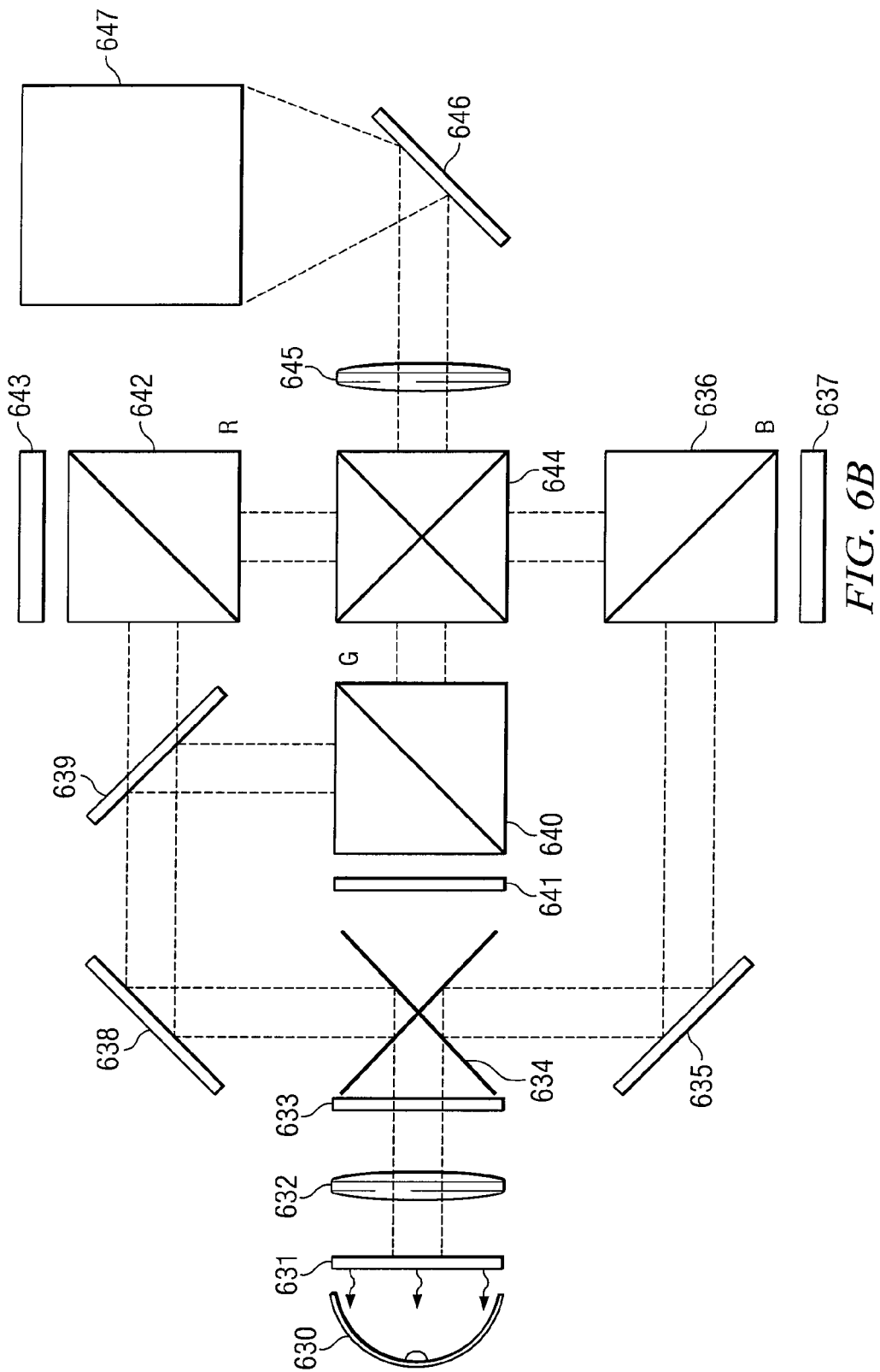
FIG. 6B is a diagram of a light processing engine based on liquid crystal on silicon.

FIG. 6b illustrates one example of a LCOS optical display unit. The light source 630 is coupled to a UV/IR filter 631, which can also be integrated with the housing of the light source 630. One or more lenses 632 can be used to shape the light. The light source 630 is also coupled to a polarization adjustment device 633, which can also be coupled to a light tunnel or light pipe integrator. One example of the polarization adjustment device 633 is a device that splits the substantially unpolarized light from the light source 630, rotates one of the polarization states to the orthogonal polarization, and then combines the two beams. In other words, the polarization adjustment device 633 can be used to orient the light from the light source 630 substantially into a single polarization of light.

The light is then coupled to a dichroic beam splitter 634 to separate blue light from the remainder of the visible spectrum. As one example, the blue light is separated in 634 and sent to one or more mirrors 635, which redirect the blue beam to a polarization modulating element 636 and 637. In this example, the remainder of the visible spectrum is separated at 634 and directed upwards to one or more mirrors 638. The remainder of the visible spectrum is then separated further at another dichroic beam splitter 639. The dichroic beam splitter 639 separates the remainder of the visible spectrum into green light and red light. For example, the green light can be directed to polarization modulating element 640 and 641, while the red light can be directed to polarization modulating element 642 and 643.

The polarization modulating elements comprise a polarization beam splitter 636, 640, 642 coupled to an LCOS chip 637, 641, 643. The polarization beam splitter 636, 640, 642 is capable of directing substantially one polarization of light to the LCOS chip 637,641,643. The LCOS chips 637, 641, 643 take an input polarization and either reflects the polarization unaltered or rotates the polarization substantially 90 degrees, depending on a control voltage applied to LCOS chip element. The LCOS chip has a number of pixels, as an example implementing a 720p or a 1080p pixel image. If the polarization of a pixel is not changed, then the polarization beam splitters 636, 640 and 642 redirect the pixel to the output path—hence corresponding to an off state. If the polarization is rotated by substantially 90 degrees by the LCOS pixel, then the pixel is passed by the polarization beam splitters 636, 640 and 642 to the output beam.

The three color output beams from the polarization modulating elements are combined at a dichroic beam splitter 644. For example, 644 can pass green and reflect red light from the top and blue light from the bottom. Then, the three colors can be combined and coupled to one or more projection lenses 645 for expanding the beam. The expanded beam can be directed to the screen 647 using one or more back reflector mirrors 646. The back reflector mirrors 646 can be flat or curved mirrors.

Figure 6C:
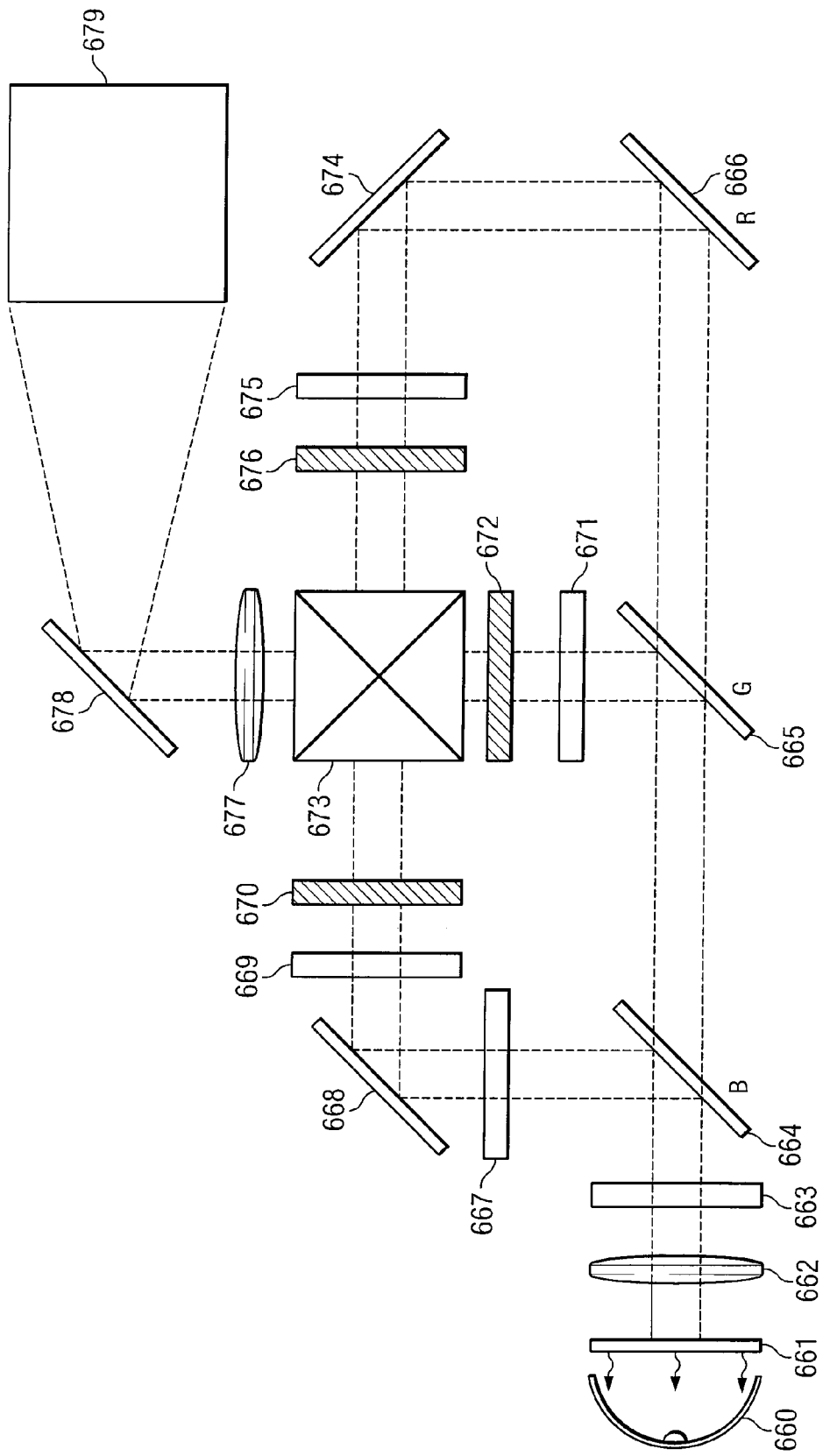
FIG. 6C is a diagram of a light processing engine based on transmissive liquid crystal display.

FIG. 6c illustrates one example of a transmissive LCD optical display unit. The light source 660 is coupled to a UV/IR filter 661, which passes to the light processor at least the visible light spectrum covering the range of approximately 400 nm to 800 nm. One or more lenses or mirrors 662 might be couple to the light source to direct the beam to the light processing unit. In addition, the light source may be coupled to a polarization state converter 663, which is capable of taking a substantially unpolarized light from the light source 660 and to convert at least a fraction of the light into substantially a single polarization of light. The polarization state converter 663 may also be coupled to a light pipe integrator, light tunnel or lens array to smoothen the light and make it more uniform over the cross-section of the beam.

Dichroic filters or mirrors 664, 665 and 666 are coupled to the light source 660 to separate the visible light into the three primary colors. In one embodiment, dichroic beam splitter 664 reflects substantially blue light, dichroic beam splitter 665 reflects substantially green light, and mirror 666 or dichroic beam splitter 666 reflects at least substantially red light. The separated colors may be coupled to a polarizers or color filters 667, 669, 671 and 675 to further purify or prepare the light incident on the LCD panels. Furthermore, other mirrors or lenses 668, 674 can be used to direct the light beams to the LCD panels.

The three primarily color light beams are modulated in one or more LCD panels 670, 672 and 676. The LCD panels 670, 672, 676 may be integrated with polarizers and analyzers on one or both sides of the LCD panels. The LCD panels will be comprised of a plurality of pixels for forming the image, for example 720p or 1080p. Unlike LCOS chips 637, 641, 643, the LCD chips or panels 670, 672, 676 operate by transmitting the on-state of light. Similar to LCOS, the LCD devices modulate the light by adjusting the polarization of light. In one embodiment, LCD 670 modulates the blue light, LCD 672 modulates the green light, and LCD 676 modulates the red light.

The modulated primary color light beams are then combined using a dichroic beam cube 673. In one embodiment, the cube 673 transmits the green light from below, reflects the blue light from the left, and reflects the red light from the right. The cube 673 is coupled to collection optics, which can include a projection lens 677 for expanding the output light beam. The projection lens 677 is further coupled to one or more back reflectors 678, which can be flat or curved mirrors. The back reflectors 678 couple the light to the screen 679 of the display.

The optical configurations of FIG. 6 are just particular examples of micro-mirror, LCOS and LCD optical display units. However, other configurations can be used within the scope of the disclosure. For instance, different types of optical modulators can be used in the optical engines. Furthermore, the order of the components can be changed, some of the components may not be required in particular embodiments, or more components may be used in the light engines. Moreover, a hybrid of these three configurations can also be used.

Figure 7A:
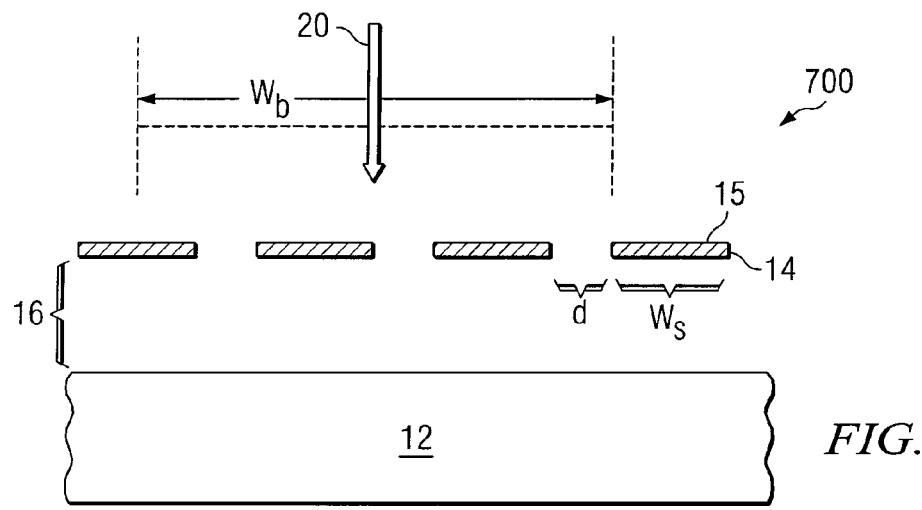
FIGS. 7a-7n are diagrams of various examples of micro-mirror devices for modulating the light beam.
Figure 7B:
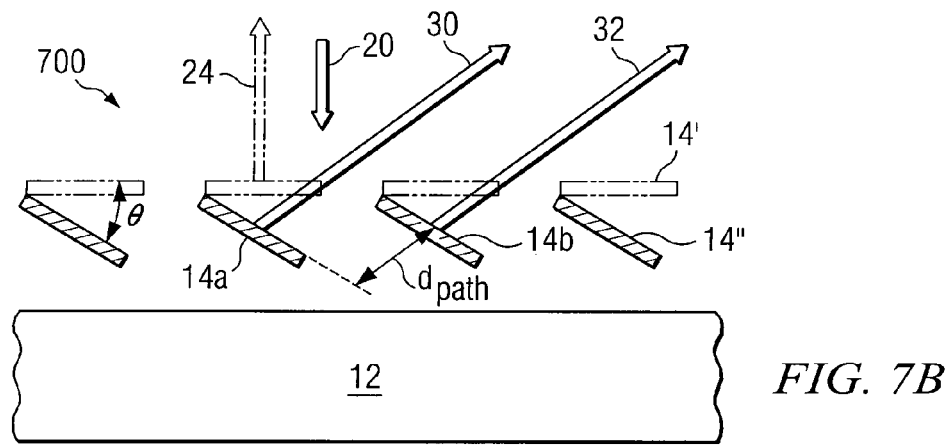
Figure 7C:
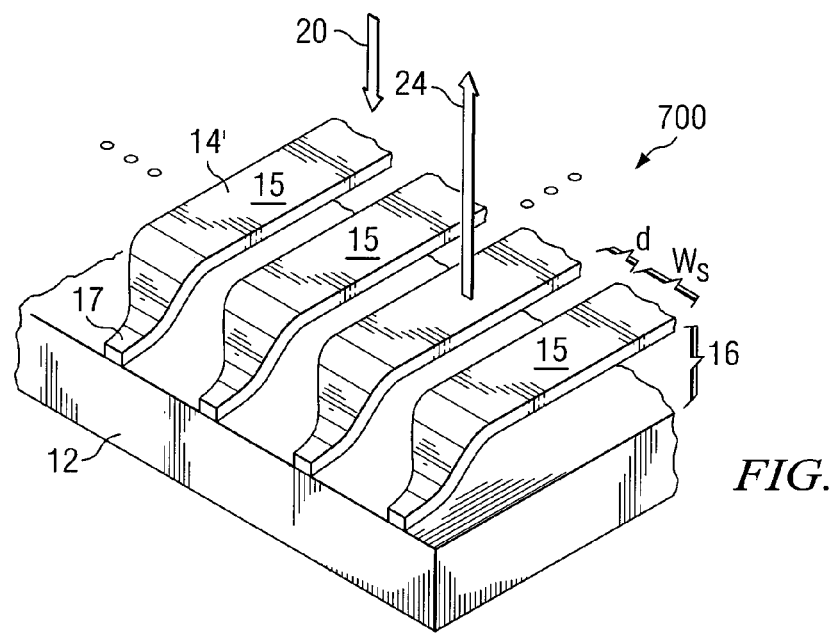
Figure 7D:
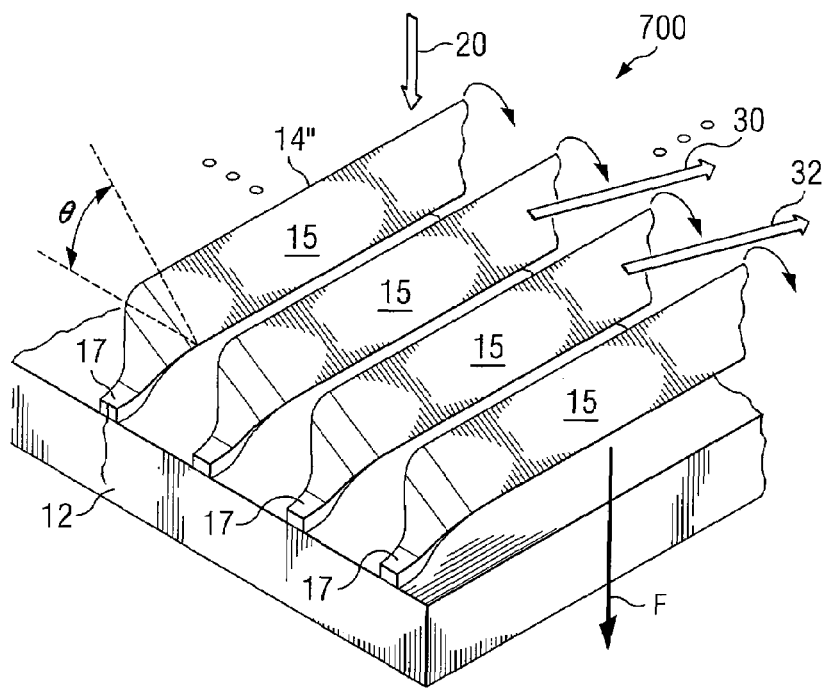
Figure 7E:
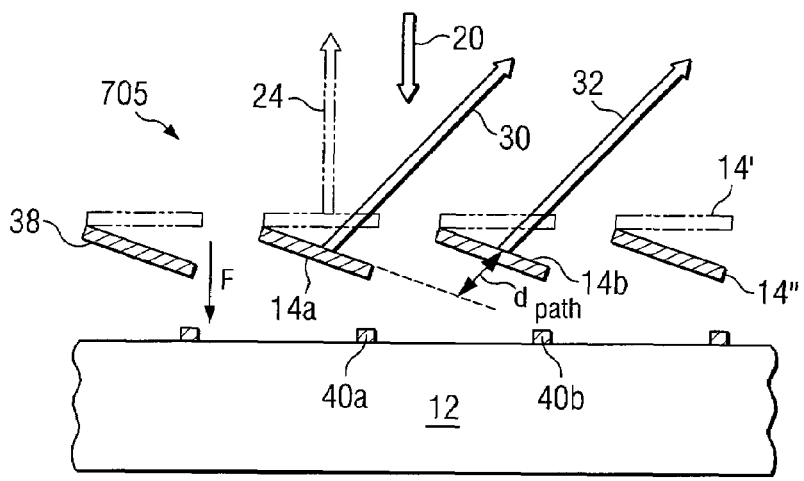
Figure 7F:
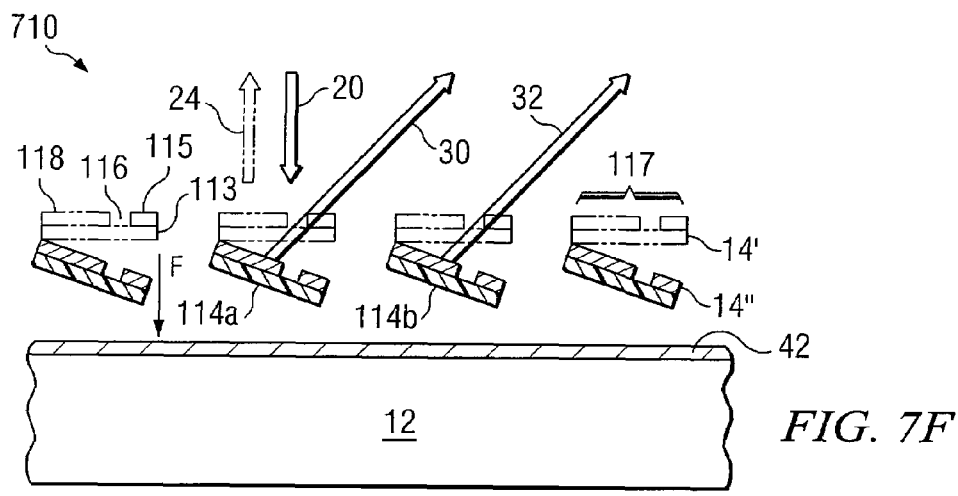
Figure 7G:
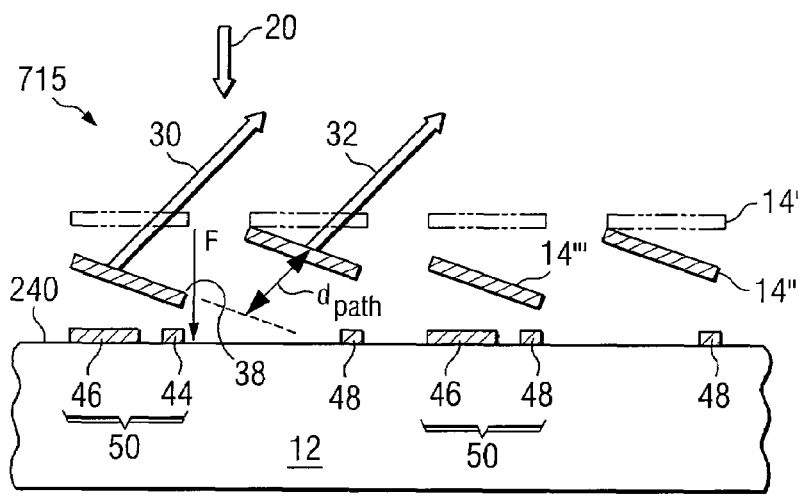
Figure 7H:
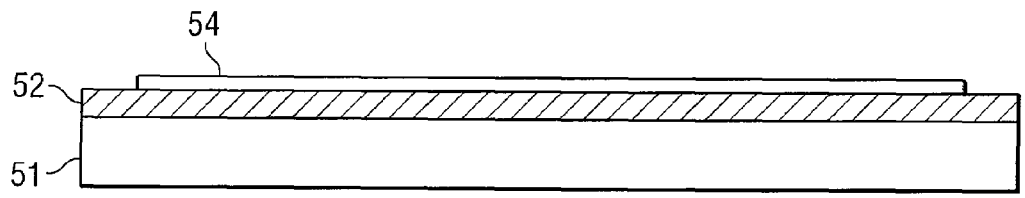
Figure 7I:
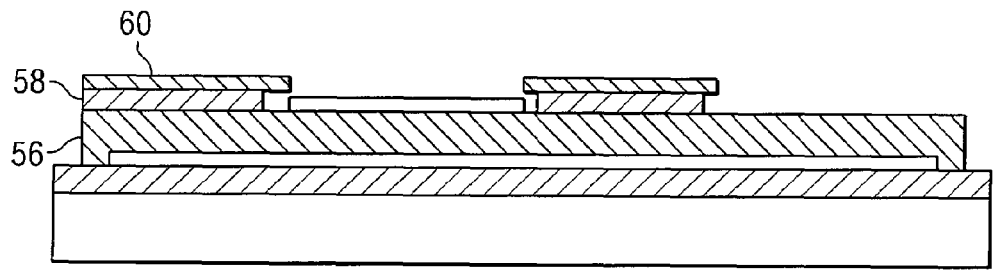
Figure 7J:
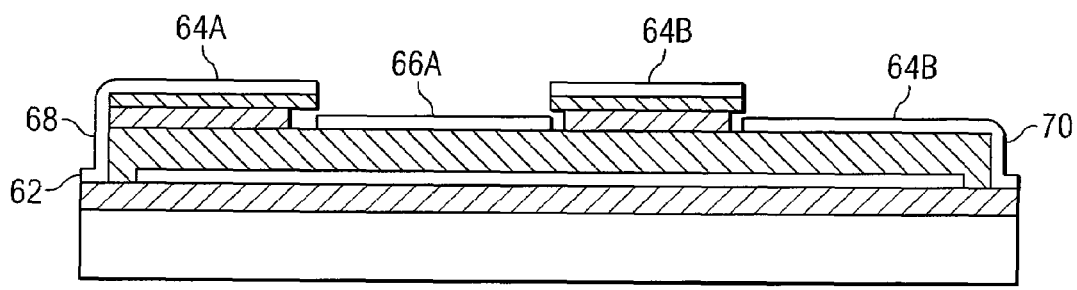
Figure 7K:
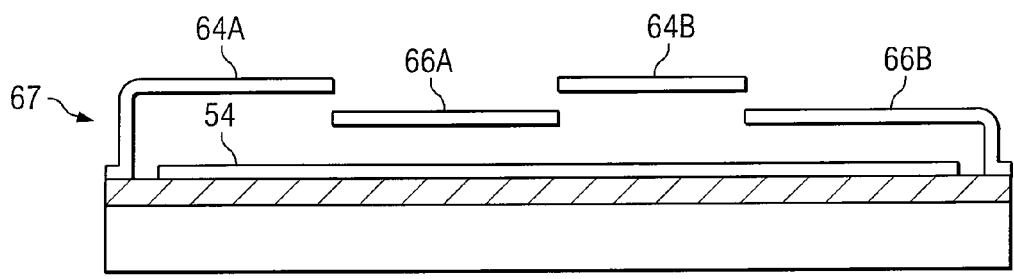
Figure 7L:
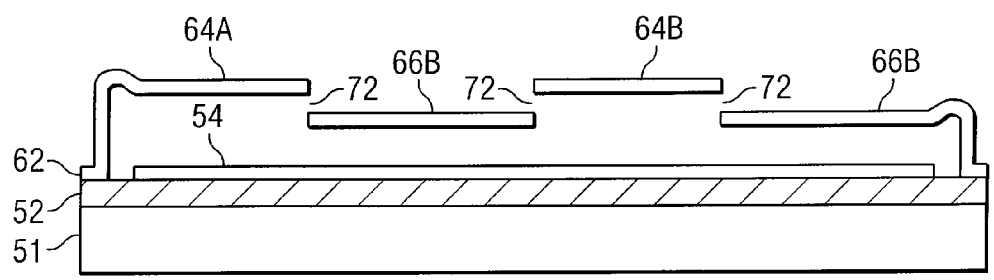
Figure 7M:
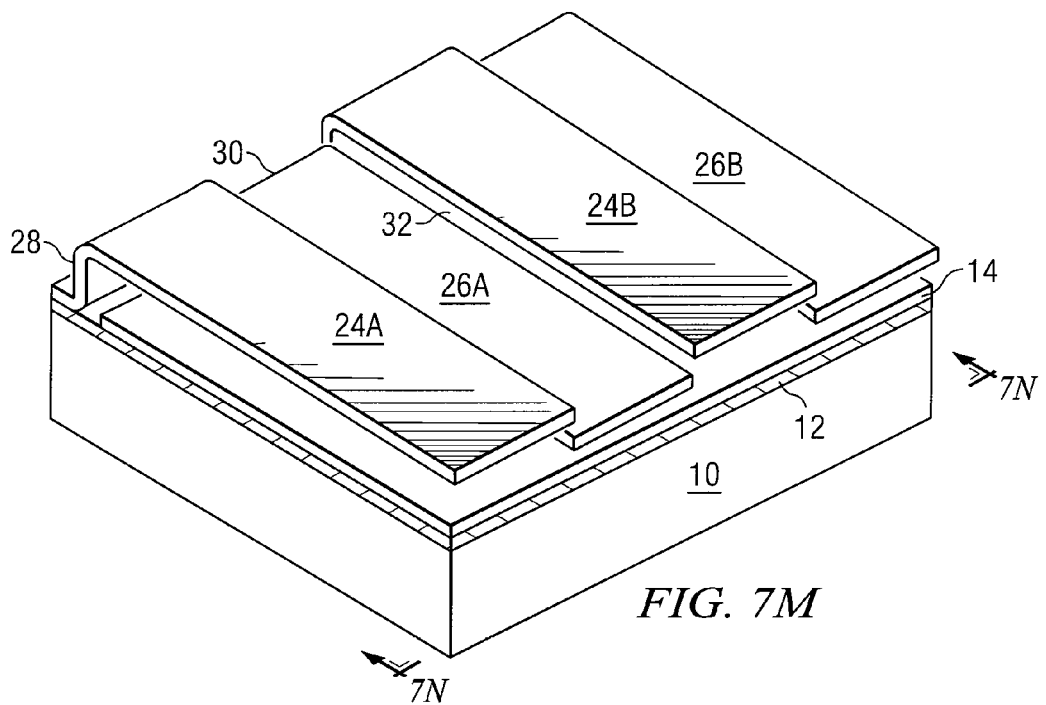
Figure 7N:
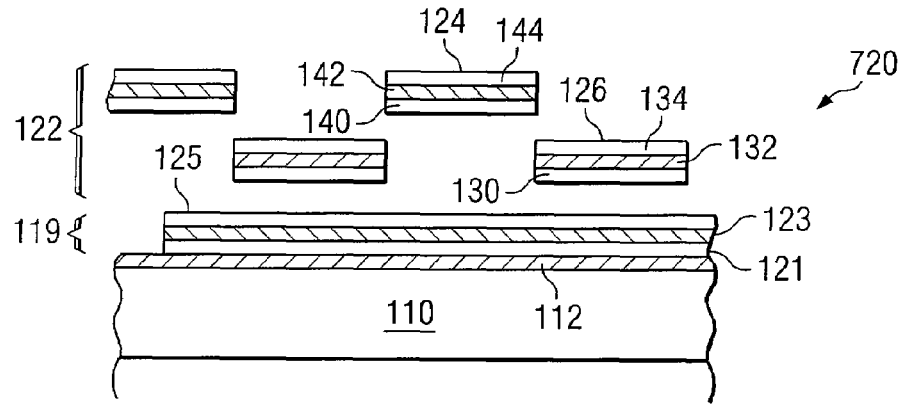

As non-limiting examples of the light modulating chips 506, FIGS. 7a-7n illustrate a few examples of micro-mirror devices. In one particular embodiment, the micro-mirror devices can comprise a variable blazed grating, as shown in FIGS. 7a-7n. FIG. 7a shows a cross-section view of one exemplary embodiment of a variable blazed grating-based apparatus 700 operable to facilitate high speed optical signal processing. Throughout this document, the term "signal processing" includes attenuation, switching, modulating, phase shifting, or any other manipulation of one or more optical signals.

In this example, apparatus 700 includes a substrate 12 and a plurality of strips 14 disposed outwardly from substrate 12. In a particular embodiment, substrate 12 comprises a semiconductor substrate formed, for example, from silicon. Other materials could be used for substrate 12 without departing from the scope of the disclosure.

Each strip 14 has a width ($W_s$), and is separated from adjacent strips by a distance (d). The width ($W_s$) and the distance (d) define a periodicity associated with the strips. Multiple strips 14 are operable to receive a single input optical signal 20 having a beam width ($W_b$). In one non-limiting example, strips 14 can be sized and spaced from one another in a manner to ensure that the width ($W_b$) of received optical beam 20 covers at least two strips 14. In this example, strips 14 residing at position 14' are spaced from substrate 12 by a distance 16. Although strips 14 are shown as generally rectangular in shape, any shape can be used consistent with the disclosure. For instance, the strips can be square-shaped or diamond-shaped reflectors. In addition, although strips 14 are shown as having a constant width ($W_s$), that measurement could vary between strips, or even along the same strip 14.

As one particular non-limiting example of particular dimensions, each strip 14 comprises a square or diamond reflector with a pitch of 13.7 microns, where the pitch is substantially equal to d plus $W_s$. Another example could comprise a pitch of 17 microns. The size of the light beam $W_b$ can be such that the reflectors 15 create a two-dimensional pixel array of light. As an example, the array can comprise 1280×720 pixels (so-called 720p), 1920×1080 pixels (so-called 1080p), or 960×1080. These dimensions are provided for illustrative purposes only. Other device dimensions and configurations could be used without departing from the scope of the disclosure.

At least outer surface 15 of each strip 14 comprises an at least partially reflective material. It is not necessary for surface 15 to be completely or even mostly reflective. Of course, the more reflective the material or materials comprising outer surface 15, the less lossy the device will be. Reflective surface 15 may comprise the outer surface of strips 14 where strips 14 are formed from a reflective material. For example, strips 14 may be formed from a metal, such as aluminum, chromium, or gold. As a further example, strips 14 could be formed from polysilicon formed at a thickness sufficient to render the strips at least partially reflective of at least the wavelengths being processed by apparatus 700. Other materials could be used to form strips 14 without departing from the scope of the disclosure.

In another embodiment, reflective surface 15 may comprise a layer of reflective material disposed outwardly from another layer of strip 14. For example, strips 14 could be formed from a material, such as, silicon nitride, and a layer of partially reflective material 15 could be formed outwardly from strip 14. In that embodiment, the layer of material supporting layer 15 may, but need not be reflective of the incident signals.

FIG. 7b illustrates one example of operation of apparatus 700. In this example, strips 14 receive optical input beam 20 at an angle normal to the surface of strips 14 at position 14.' Strips 14 at position 14' (shown in dotted lines) show apparatus 100 operating in "reflection mode," where strips 14 operate to reflect input optical beam 20 as reflected signal 24. In this case, because input beam 20 is oriented normally to the surfaces of strips 14, reflected beam 24 is communicated back in the same direction from which input beam 20 originated. The normal input angle is just one example, and non-normal input angles could also be used.

Strips at positions 14" (shown in solid lines) depict strips 14 during a second mode of operation, "diffraction mode." In diffraction mode, strips 14 are each rotated by approximately a blaze angle THETA from the original position of strips 14.

In a particular embodiment, strips 14 can obtain a maximum blaze angle that is greater than two degrees. In a preferred embodiment, the angle of rotation from the normal of strips 14 is 10 degrees. In another preferred embodiment, the angle of rotation from the normal of strips 14 is 12 degrees. Implementing a design that facilitates a wide range of strip rotation provides significant advantages over other approaches by, for example, providing flexibility in system configuration. Input optical beam 20 impinges on surfaces 15 of strips 14. In this example, a first portion of input optical beam 20 impinges on strip 14a, while a second portion of beam 20 impinges on strip 14b, which is adjacent to strip 14a. While beam 20 may experience some scattering, because of the rotation of strips 14 to position 14", the majority of the diffracted portions of input beam 20 are directed in one direction, as illustrated (at least in part) by output rays 30 and 32.

Output ray 30 represents the portion of input beam 20 reflected by strip 14a at position 14" and output beam 32 represents the portion of input beam 20 that is reflected by strip 14b at position 14". Although FIG. 7b shows just two output rays 30 and 32, it should be appreciated that any strips 14' that receive a portion of input beam 20 will reflect an output portion in the direction indicated by arrows 30 and 32.

Because output rays 30 and 32 result from diffractions or reflection from surfaces laterally offset from one another and positioned at an angle to input beam 20, output rays 30 and 32 experience a relative difference ($d_{path}$) in their path lengths. This path length difference ($d_{path}$) results in a phase difference between the output rays. For a given wavelength and strip periodicity, apparatus 700 can introduce any level of phase difference between output rays by varying the angle THETA by which the strips 14 are rotated. When using a normal incident input beam 20, the diffracted output signal comprising a combination of diffracted rays, such as 30 and 32, is at a maximum when the path difference $d_{path}$ corresponds to one wavelength (or an integral multiple of wavelengths) of beam 20. Other path differences $d_{path}$ result in an attenuation of the output signal compared to the maximum condition.

Although FIGS. 7a and 7b illustrate one embodiment of the variable blazed grating, other configurations and modes of operation can be used consistent with the disclosure. For example, the operation of the mirrors can be in diffraction or reflection. Also, either a group of mirrors can move in unison, each rotating substantially the same as the neighboring mirrors, or each of the mirrors can be individually addressable and each mirror is capable of moving differently from the neighboring mirrors. Furthermore, the angle of incidence and reflection of the light can be normal or non-normal to the mirror surfaces. In addition, although the rotation is illustrated as lowering on one side and tilting to one side, different rotation axes can be used. As one non-limiting example, the mirrors can be mounted to pivot about the center of the mirror. The mirror then appears to move more in a see-saw type manner. As an example, the mirrors can move about a hinge approximately centered in the mirror, and the mirror can rotate plus or minus 10 degrees or plus or minus 12 degrees, where the angles are measured with respect to the normal to the substrate.

Previous systems using variable blazed gratings either implemented continuous deformable membranes or implemented multiple-piece membranes requiring very wide slats (typically ranging in width from nearly 60,000 nanometers (60 microns) to over 80,000 nanometers (80 microns)). The systems using slats require wide slats due to the high power of the optical signals being redirected and, as a consequence, are severely limited in their ability to rotate to change the blaze angle (typically limited to a maximum blaze angle of approximately 1.8 degrees).

One aspect of the present disclosure uses narrow strips, no wider than 40,000 nanometers (40 microns), to ensure greater blaze angle capabilities, lower drive voltage, and faster operation, while maintaining good contrast ratios and high output beam resolution as compared to other approaches. In a preferred embodiment, the strips are no wider than 13,700 nanometers (13.7 microns), and yet another embodiment the strips are no wider than 17,000 nanometers (17 microns).

The maximum switching speed, the minimum required drive voltages, and the maximum attainable blaze angle depend, at least in part, on the width of strips 14 and the ratio of that width to the space 16 separating strips 14 from substrate 12 (or another layer disposed outwardly from substrate 12). In one embodiment, these devices operate by introducing a path difference $d_{path}$ between diffracted signal portions to create a desired phase shift between the portions. The path difference is typically some fraction of a wavelength of the signal being processed. In a particular embodiment, the spacing 16 can be selected to facilitate a maximum strip displacement of approximately one wavelength of the signal being processed. This facilitates introduction of any path difference up to a full wavelength of the signal.

For a given wavelength signal, the strip width and maximum strip displacement can be selected to provide any desired blaze angle. Typical telecommunication signals have wavelengths of approximately 1400-1600 nanometers. The following table shows example values of strip widths that can be useful using, for example, a 1400 nanometer maximum strip displacement.

Assuming maximum strip displacement=1400 nanometers,

| Maximum Blaze Angle | Strip Width |
| --- | --- |
| 2 degrees | 40 microns |
| 5 degrees | 16 microns |
| 7.5 degrees | 10.6 microns |
| 10 degrees | 7.9 microns |
| 15 degrees | 5.3 microns |
| 20 degrees | 3.8 microns |
| 25 degrees | 3.0 microns |
| 30 degrees | 2.4 microns |
| 45 degrees | 1.4 microns |

The foregoing table is intended to provide example dimensions only. Other device configurations could be used using other spacings 16, strip widths, and/or maximum blaze angles.

As an example of another embodiment, the light source can operate in the visible light range, such as wavelengths between approximately 400 nm to 800 nm. In one particular embodiment, the mirrors can be 13 microns or less in size. In another embodiment, the mirrors can be 17 microns or less in size. The angle of rotation from a normal to the substrate can be plus and minus 10 degrees in a particular embodiment. In yet another embodiment, the angle of rotation from a normal to the substrate can be plus or minus 12 degrees.

Various aspects of the present disclosure provide advantages over previous approaches by providing blazed grating having a number of narrow strips. Narrow strips facilitate larger maximum blaze angles for a given distance 16 from substrate 12. This provides increased flexibility in component configuration for applications using these devices. In addition, the narrow width of strips 14 allows the strips to be placed closer to substrate 12 while maintaining flexibility in the attainable blaze angles. Placing the strips closer to substrate 12 provides an advantage of reducing the energy needed to rotate the strips (whether in the form of an electrostatic force between the strips and the substrate or in the form of a forced caused by thermal expansion of a material between the substrate and the strips).

Moreover, reducing the width of strips 14 facilitates faster device operation and lower drive voltages. Using a number of narrow strips 14 further provides an advantage of increasing the resolution of the diffracted or reflected output of the device. One aspect of the disclosure recognizes that the resolution of the output signal comprising the majority of the diffracted portions of input beam 20 increases as the number of strips illuminated by input beam 20 increases. This aspect of the disclosure, therefore, facilitates enhancing the resolution of the diffracted output by sizing strips 14 so that input beam 20 illuminates a number of strips 14.

As will be discussed in more detail below, the ability of blazed grating apparatus 700 to selectively attenuate and/or switch optical input beams quickly, while requiring a low drive voltage and maintaining a good contrast ratio renders apparatus 700 useful in a myriad of applications, such as variable attenuators, gain equalizers, optical switches, optical add/drop multiplexers, and/or an optical modulator, to name a few. The voltage difference between the movable mirror and the electrodes above the substrate can comprise the difference between the drive voltage and a bias voltage. The drive voltage can exemplary have values between zero and 7.5 v. In one embodiment, the bias voltage can be time varying and range in value from plus 24 v to minus 26 v. These are exemplary values for the bias and drive voltages, but any other values can be used consistent with the disclosure. From the above example, it should be clear that the voltage difference between the movable mirror and the electrodes can take on a plurality of non-zero voltage values.

FIGS. 7c and 7d illustrate planar views of one particular embodiment of apparatus 700. As shown in these FIGURES, strips 14 can be anchored to substrate 12 at anchor points 17. In this embodiment, anchor points have a width ($W_a$) that is smaller than the width ($W_s$) of at least a portion of strip 14. In this manner, strips 14 operate to undergo a partial rotation as shown in FIG. 7d when a force (F) is applied to one side of each strip 14. Apparatus 700 controls the grating angle THETA by applying a selected level of force (F) in selected locations of strips 14.

Other methods of anchoring strips 14 to facilitate rotation could be used consistent with the disclosure. For example, the strips can comprise square or diamond shape mirrors. These square or diamond shaped mirrors could have a center post, rather than being tied at the ends as illustrated in FIGS. 7c and 7d. Using the center post, the square or diamond shaped mirrors can operate in a see-saw like manner to swing down one way or the other. In one particular embodiment, the motion of the mirrors can be digital-like, with stops to have the mirror touch the stops on one side or the other side. Alternately, in another embodiment the motion of the mirrors could be more analog like, with different angles of operation possible.

FIG. 7e is a cross-sectional diagram showing one example of a mechanism operable to generate and apply a force (F) to cause a partial rotation of strips 14 in a blazed grating apparatus 705. The illustrated embodiment assumes that force (F) is an electrostatic force generated by a voltage differential between an inner conductive layer and at least a portion of grating 14. Alternatively, force (F) could comprise a force pushing up on strips 14 and created by applying a heat source to the inner conductive layer causing that layer to physically expand and push up on a portion of strip 14, causing strip 14 to rotate. In that embodiment, the inner conductive layer could be considerably thicker than the embodiment shown in FIG. 7e.

Apparatus 105 is similar in structure and operation to apparatus 100 shown in FIGS. 7a-7d. In one particular embodiment, strips 14 can be constructed from an at least substantially conductive material. For example, strips 14 may be formed from a metal such as aluminum, gold, or titanium, or may be formed from polysilicon. Where strips 14 are formed from polysilicon, the strips may, if desired, be doped to achieve additional conductivity.

The illustrated embodiment of apparatus 705 includes an inner conductive layer 40, which in this case takes the form of a plurality of elongated conductors, each disposed inwardly from one side of (perhaps along an edge 38 of) strip 14 that is desired to be pulled toward substrate 12. Although shown as rectangular in shape, the inner conductive layer 40 can have any desired shape, including square shape, triangular shape, or trapezoidal shape. Each conductor of inner conductive layer 40 may be formed, for example, from a metal such as aluminum, chromium, or gold. Other at least substantially conductive materials could be used without departing from the scope of the disclosure. Although this example assumes creation of an electrostatic force (F), similar results could be obtained by thermally expanding the inner conductive layer to cause a rotation in strip 14.

To increase the contrast of the display resulting from using apparatus 705, the substrate and inner conductive layer 40 can also be coated with a substantially non-reflective coating. As one particular example, the coating can be a dark metal coating, which can substantially reduce the stray light reflected from the substrate and inner conductors. Other coatings to reduce the stray light generation can also be used consistent with the disclosure.

By applying a voltage difference between conductors 40 and strips 14 desired to be rotated, an electrostatic force (F) is generated that acts to pull edge 38 of strip 14 toward conductor 40. This, in turn, operates to partially rotate strip 14 as shown in FIG. 7e. The voltage difference between strips 14 and conductors 40 may be established, for example, by grounding strips 14 while applying a voltage to conductors 40, grounding conductors 40 while applying a voltage to strips 14, or applying a differential voltage between strips 14 and conductors 40. In the illustrated example, a common voltage (or ground) is applied to all strips 14. Alternatively, selected strips 14 could be rotated while others remain stationary.

FIG. 7f is a cross-sectional diagram showing another example of a mechanism operable to generate and apply a force (F) to cause a partial rotation of strips 114 in an apparatus 710. In this example, strips 114 are similar in function to strips 14 of FIGS. 7a-7e. However, in this case, strips 114 each comprise a multi-layered structure. In this example, each strip 114 includes a layer of insulating material 113. Insulating material 113 may comprise, for example, silicon nitride, oxide, or any other substantially insulating material.

In the illustrated embodiment, a layer 117 of material that is at least partially reflective is formed outwardly from layer 113. For example, layer 117 may comprise a metal or doped polysilicon. Layer 117 includes a first portion 115 and a second portion 118. Portions 115 and 118 are electrically separated, in this example by a channel 116. Channel 116 may comprise an open channel, or may be filled with an insulating material, such as oxide, or silicon nitride.

Portions 115 and 118 may be formed, for example by first forming a continuous layer 117 of material, and then etching channel 116 to form the first and second portions on either side of channel 116. Alternatively, portions 115 and 118 may be formed by first masking channel 116, and then forming first and second portions 115 and 118 on either side of channel 116. First and second portions 115 and 118 may, but need not be formed from the same material.

Blazed grating apparatus 710, like apparatus 705, also includes an inner conductive layer 42. While apparatus 705 includes an inner conductive layer 40 in the form of a plurality of elongated conductors, apparatus 710 comprises an inner conductive layer 42 in the form of a continuous conductor layer disposed outwardly from substrate 12. In an alternative embodiment, inner conductive layer 42 could comprise substrate 12, where substrate 12 comprises a substantially conductive material, such as metal or doped polysilicon. Inner conductive layer 42 may comprise any configuration of at least substantially conductive material operable to cause a partial rotation of some or all of strips 14. In one particular embodiment, it may be advantageous to coat the inner conductive layer 42 with a substantially non-reflective coating, such as a dark metal coating.

As illustrated, for example, by FIG. 7f, first portion 115 of reflective conducting layer 117 is at least substantially electrically isolated from inner conductive layer 42. In addition, second portion 118 of reflective conducting layer 117 is electrically coupled to inner conductive layer 42 at a contact point (not explicitly shown). This construction can allow apparatus 710 to maintain a partially reflective outer surface of strips 114, while facilitating creation of a voltage differential between inner conductive layer 42 and only the edges of strips 114 that carry first portions 115 of conductive reflecting layer 117. This, in turn, facilitates partial rotation of strips 114 upon application of a differential voltage between inner conductive layer 140 and first portions 115 of strips 114.

In operation, blazed grating apparatus 710 receives optical input beam 20, in this example, at a normal angle of incidence. Although this description assumes a normal angle of incidence for optical beam 20, non-normal incident angles could be used without departing from the scope of the disclosure. In reflection mode (as indicated in FIG. 7f by dashed lines) apparatus 710 substantially reflects input optical beam 20 back in the same direction as output beam 24. In diffraction mode, apparatus 710 diffracts input optical beam 20 primarily in a direction as indicated by output rays 30 and 32. By varying the angle THETA between strip position 114' and position 114", apparatus 710 can control the phase difference introduced between rays 30 and 32, and therefore control the intensity of the output signal. Although discussed in diffraction mode, the mirrors can also be used in reflection mode, where each mirror can operate independently.

In this example, rotation of strips 114 is accomplished by creating a voltage differential between inner conductive layer 42 and first portion 115 of reflective conducting layer 117. Because second portion 118 of reflective conducting layer 117 is electrically coupled to inner conductive layer 42, little or no electrostatic force is generated between inner conductive layer 42 and second portion 118 of reflective conducting layer 117. Because, however, first portion 115 of reflective conducting layer 117 is electrically isolated from inner conductive layer 42, a voltage difference between those substantially conducting structures creates an electrostatic force, which operates to pull first portion 115 toward inner conductive layer 42. This, in turn, operates to partially rotate strip 114, causing diffraction of the majority of input beam 20 in one direction as indicated by output rays 30 and 32. The example shown in FIG. 7f is intended to illustrate one possible embodiment of apparatus 710. Various changes to the configuration and materials described herein could be made without departing from the scope of the disclosure.

FIG. 7g is a cross-sectional and planar diagram showing still another example of a mechanism operable to generate and apply a force (F) to cause a partial rotation of strips 14 in a blazed grating apparatus 715. In addition, the embodiment shown in FIG. 7g operates to cause alternate strips 14 to not only partially rotate, but also to move in their entirety toward substrate 12. The result of this alternating strip translation is a diffraction mode of operation wherein all strips 14 are partially rotated, and wherein alternate strips reside in different planes relative to their adjacent strips 14. This configuration can provide additional phase shift between diffracted output rays for a given angle THETA of strip rotation. Although described as being in diffraction mode, the configuration of FIG. 7g can also be used in reflection mode, with each mirror capable of independent motion.

In this example, strips 14 are similar in structure and function to strips 14 shown in FIG. 7e. Strips 14 may comprise any material or combination of materials operable to render an at least substantially conductive and at least partially reflective strip 14. The illustrated embodiment of apparatus 115 includes an inner conductive layer 240. Inner conductive layer 240 in this embodiment comprises alternating sets of single elongated conductors 48 and pairs 50 of conductor sets 44 and 46, all disposed outwardly from substrate 12. Single elongated conductors 48 and conductors 46 of set of conductors 50 reside approximately inwardly from the edges of strips 14 desired to be rotated toward substrate 12. Conductors 46 also reside inwardly from strips 14, but are electrically separated from conductors 44. The illustrated embodiment provides just one example of a conductor configuration operable to achieve the above-described results. Other configurations could be used without departing from the scope of the disclosure. For example, the electrodes 50 can be of any shape, including square, triangular or trapezoidal. In addition, there can also be a substantially non-reflective coating placed above the substrate and inner conductors 240, such as a dark metal coating.

In operation, where it is desired to switch blazed grating apparatus 715 from a reflection mode to a diffraction mode, a voltage differential is created between strips 14 and inner conductive layer 240. In this particular embodiment, a first voltage differential is created between strips 14 and conductors 46, and a second and larger voltage differential is created between strips 14 and conductors 44 and 48. Creating a voltage differential between edges 38 of each strip and the conductors 44 and 48 residing inwardly from those edges causes all strips to rotate. In addition, creating a voltage differential between all or a portion of the remainder of alternated strip cross sections and conductors 46 causes alternate strips to move inwardly relative to adjacent strips. By creating a larger voltage differential between strips 14 and conductors 44, 48 (which pull edges 38 toward substrate 12) than the differential between strips 14 and conductors 46 (which pull edges opposite edges 38 of the alternate strips toward substrate 12), this arrangement facilitates rotating all strips 14 while pulling alternate strips 14 closer to inner conductive layer 240 than adjacent strips 14.

In a reflection mode of operation, blazed grating apparatus 715 receives optical input beam 20, and reflects beam 20 at an angle equal to the angle of incidence of beam 20. Where strips 14 receive beam 20 at a normal incident angle, output beam 24 is reflected at an angle normal to strips 14. In diffraction mode of operation, all strips 14 partially rotate toward substrate 12, and alternate strips 14 move inwardly toward substrate 12. The motion of strips 14 results in a phase shift between portions of the output beam, which may create constructive or destructive interference, depending on the grating angle THETA and amount of relative motion between adjacent strips.

Although this example describes a normal incident input beam, other angles of incidence could be used. Also, although this example describes one or more mirrors moving substantially in unison, each mirror or a set of mirrors could be individually addressable and each mirror can be capable of independent motion. Operation in reflection or diffraction mode is possible as well.

As another non-limiting example of the light modulating chips 506, FIGS. 7h-n illustrate a few examples of micromirror devices. In one particular embodiment, the optical switching element of the present disclosure is formed on an outer surface of a substrate 51 shown in FIG. 7h. Substrate 51 may comprise, for example, n-type silicon or indium phosphide. As will be described herein, in one mode of operation, it is advantageous if the substrate is optically transmissive in the wavelength range of the optical signal to be switched by the element. To facilitate that mode of operation, in a particular embodiment, a single crystalline silicon substrate can be manufactured so that it is optically transmissive in the range of wavelengths between approximately 1,700 to approximately 1,700 nanometers with an optimal transmissive wavelength of approximately 1,500 nanometers.

Referring again to FIG. 7h, an antireflective layer 52 is deposited or grown on an outer surface of the substrate 51. Antireflective layer 52 may comprise, for example, a layer of silicon nitride. In the illustrated embodiment, layer 54 is formed to be one-quarter wavelength in optical thickness. The optical thickness and physical thickness are related by the equation $$d = \frac{\lambda}{4n}$$

where d is the physical thickness, n is the index of refraction of the material through which the light is passing, and λ is the wavelength of the light. For a optimum wavelength of 1.5 microns or 1,500 nanometers and a refractive index of silicon nitride which is equal to approximately 1.9 at this wavelength, the physical thickness of antireflective layer 52 will be approximately 2,000 Angstroms. It is advantageous if the index of refraction of the substrate is approximately the square of the index of refraction of the material comprising antireflective layer 52. The effective optical thickness of layer 52 can be tuned to more closely approximate one-quarter wavelength, for example, by changing the ratio of silicon and nitride during its formation or by changing the physical thickness of that layer.

Other materials can be used to form the antireflective layer 52. For example, layer 52 may comprise silicon dioxide or other suitable dielectric material or combination of materials. Although antireflective layer 52 has been described as having an optical thickness of one-quarter wavelength, antireflective layer 52 will operate adequately at an optical thickness of anywhere between one-eighth of the wavelength and three-eighths of the wavelength.

Referring again to FIG. 7h, a fixed layer 54 is formed outwardly from antireflective layer 52. In a particular embodiment where fixed layer 54 will comprise part of a Fabry-Perot interference cavity, fixed layer 54 comprises a fixed mirror layer formed from an at least partially reflective material.

In one embodiment, fixed layer 54 may comprise, for example, polycrystalline silicon (polysilicon) which has been doped sufficiently to render it at least substantially conductive. Fixed layer 54 may be doped, for example, using phosphorous or other suitable dopant or dopants. Forming fixed layer 54 from polysilicon facilitates at least some transmission of optical signals incident on fixed layer 54 through substrate 51. This construction may be useful, for example, where element 51 will be used as an optical switch operating in a pass-through mode.

In an alternative embodiment, fixed layer 54 may be formed from a metal, such as gold or aluminum, which is substantially reflective of the incident optical signals. This embodiment could be useful, for example, in an optical switch using a non-pass through mode. Where a metal is used to form fixed layer 54, a protective layer may be grown or deposited outwardly from fixed layer 54.

In the illustrated embodiment, fixed layer 54 is also formed to an optical thickness of approximately one-quarter wavelength. Where fixed layer 54 is constructed to provide an optical thickness of approximately one-quarter wavelength, the physical thickness of fixed layer 54 will be on the order of 1,000 Angstroms. The relatively smaller physical thickness of fixed layer 54 results from the relatively larger index of refraction of silicon, which is typically on the order of 3.5. Although not shown in the cross-section illustrated in FIG. 7h, suitable polysilicon conductive structures, bond pads, and other structures may be created so that a voltage signal can be applied to fixed layer 54.

Referring to FIG. 7i, a number of sacrificial layers are formed outwardly from fixed layer 54 to provide an interim substrate on which to form a movable outer mirror assembly. An inner sacrificial layer 56 is formed outwardly from fixed layer 54. Layer 56 may comprise, for example, silicon dioxide deposited to a depth that will eventually represent the spacing between fixed layer 54 and an inner strip portion of the movable mirror assembly. In a particular embodiment, this spacing defines an air gap on the order of one-half of a wavelength in thickness. Accordingly, for a 1.5 micron wavelength, the spacing should be on the order of 7,500 Angstroms in depth.

In an alternative embodiment, this air gap could be on the order of one full wavelength. This embodiment provides an advantage of ensuring that a moveable mirror assembly does not contact the fixed layer 54 when a voltage is applied between those layers. In that case, inner sacrificial layer 56 should be formed to a depth of approximately 15,000 Angstroms for a 1.5 micron wavelength signal. In other embodiments, inner sacrificial layer 56 could be formed to any integer multiple number of one half wavelengths and remain within the scope of this disclosure. Protective pads, or stops, could also be formed outwardly from fixed layer 54 and inwardly from the movable mirror layer (to be later formed) to further protect against the moveable mirror assembly contacting fixed layer 54 during operation.

A median sacrificial layer 58 is formed on the outer surface of inner sacrificial oxide layer 56. Layer 58 may comprise, for example, a layer of phosphosilicate glass deposited to a depth on the order of 5,000 Angstroms. An outer sacrificial oxide layer 60 is formed on the outer surface of layer 58. Outer sacrificial oxide layer 60 may comprise, for example, a layer of silicon dioxide formed to a depth on the order of 2,500 Angstroms.

In the illustrated embodiment, dimensions of layers within the optical switching element are selected to provide light transmission through the optical switching element during a no-voltage condition. In this manner, the disclosure provides an advantage of facilitating signal passthrough upon an element failure. The illustrated embodiment facilitates this characteristic by forming inner sacrificial layer 56 to ultimately provide an air gap that is one half wavelength or an integer multiple of one-half of one wavelength of the optical signal received.

In another embodiment, the optical switching element could be constructed to operate in a non-transmissive mode during a no-voltage condition. For example, inner sacrificial layer 56 can be formed to ultimately provide an air gap comprising an odd integer multiple of one-quarter wavelengths of the optical signal.

The structure formed by sacrificial layer 56, 58 and 60 is patterned using conventional photolithographic techniques and etched using a suitable plasma assisted fluorine based etchant process to expose portions of the outer surface of layer 56. As a particular example, a hydrogen fluoride etchant may be used comprising 15 milliliters of 49 percent hydrofluoric acid, 51 milliliters of HNO3, and 700 milliliters of water. This reactant will result in an etch rate on the order of 568 Angstroms per minute. In another example, a gas mixture for plasma etching may contain oxygen and trifluoromethane in a pressure ratio on the order of 6:85. At an RF power of about 68 W, the plasma formed from this gas mixture etches 8% LTO at a rate approaching 380 angstroms per minute. Other suitable etching procedures could be used without departing from the scope of the disclosure.

The structure resulting from the etch process is shown in FIG. 7i. It should be noted that the differing properties of silicon dioxide and phosphosilicate glass result in an undercutting of layer 58 resulting in extensions of layer 60 over and past the borders of layer 58. For example, phosphosilicate glass typically etches more quickly than silicone dioxide in the presence of a fluorine based etchant. By selecting appropriate materials, amounts, and locations for the sacrificial layers 56-60 as well as an appropriate etchant, etch rate, and temperature, the amount of undercut can be controlled. This undercutting is also shown in FIG. 7i. This undercut allows for the self-aligned formation of the outer movable mirror layer strips to occur relative to the inner strips described previously. The above-described process provides efficiency advantages in manufacture by creating the resulting undercut structure using a single etch.

Referring to FIG. 7j, a movable mirror layer 62, which may comprise polysilicon doped with a sufficient amount of, for example, phosphorous to render it at least substantially conductive is formed outwardly from the exposed portions of layers 56 and 60. Movable mirror layer 62 is comprised of outer mirror strips, which are exemplified by strips 64a and 64b shown in FIG. 7j and inner mirror strips, which are exemplified by inner mirror strips 66a and 66b shown in FIG. 7j. In the illustrated embodiment, each of outer layer strips 64 and inner layer strips is formed to a depth on the order of 1,000 Angstroms in thickness using the same processes as described with reference to fixed layer 54.

On the periphery of the movable mirror layer 62, the layer 62 is anchored to the substrate by anchor portions 68 and 70. It should be understood that anchor portions 68 and 70 are shown in FIG. 7k solely for purposes of teaching the structure of the present disclosure. In actual construction, a strip is not anchored at its side as shown in FIG. 7j but rather at its ends.

As such, anchors 68 and 70 are actually disposed on opposite ends of the strips as will be discussed and described with reference to FIG. 7m herein.

FIG. 7k illustrates the structure following the removal of the sacrificial layers 56, 58 and 60 using an isotropic oxide etch. The removal of these layers results in a movable mirror assembly indicated generally at 67 comprising the outer and inner mirror strips 64a, 64b, and 66a and 66b, respectively. The movable mirror assembly 67 is operable to move relative to the outer surface of substrate 51 and especially the outer surface of the fixed layer 54 as shown in FIG. 7l. In this manner, the distance between the fixed layer 54 and the inner surface of the movable mirror strips 64a-b and 66a-b changes. The change in the distance of this cavity changes the transmissive effects on light that is passing through the assembly 67 and the antireflective layer 52 and the substrate 51. Where fixed layer 54 comprises a fixed mirror layer, the resulting interference structure is commonly referred to as a Fabry-Perot cavity.

Throughout this document, the term "assembly" refers to two or more components that collectively form the assembly. Although a particular embodiment of a moveable mirror assembly has been described as comprising inner and outer strips separated from the fixed mirror layer by different distances, other configurations could be implemented without departing from the present disclosure. For example, the moveable mirror assembly could comprise a plurality of strips that are each a substantially equal distance from the fixed layer.

In operation of the embodiment shown in FIGS. 7h-l, there is an electrical connection to fixed layer 54 and movable mirror strips 64a-b and 66a-b. When a voltage is placed between fixed layer 54 and movable mirror layer 62, the electrostatic force resulting from such a voltage causes movable mirror layer 62 to deform toward fixed layer 54. This deformation causes the transmissive quality of the entire structure to change. For example, in the illustrated embodiment, structures have been formed to provide an approximately one wavelength air gap between fixed layer 54 and inner strips 66a-b, so that the device transmits the optical signal when no voltage is applied. When a voltage is applied and movable mirror assembly 67 is pulled toward fixed mirror assembly 54 by approximately one-quarter of a wavelength, it creates a destructive interference effect, reducing the transmission through the optical element. It should be understood that deformation by a distance equal to any odd multiple of one-quarter of a wavelength will have the same interference effect.

In a particular embodiment, the movement of the moveable mirror assembly is unitary. In this document, the term "unitary" describes a movement in which all of the components operable to move in response to a triggering event move when any of those components move. In the particular embodiment implementing a moveable mirror assembly comprising inner and outer strips, the moveable mirror assembly may undergo a unitary movement causing the inner and outer strips to move substantially in unison. In other embodiments, the components of the moveable mirror assembly may move independent from one another.

Although the embodiment depicted in FIG. 7l shows deformation of movable mirror assembly 67 toward fixed layer 54, alternative structures could be formed to deform movable mirror assembly 67 away from fixed layer 54, creating a similar optical effect.

As discussed above, the optical device shown in FIGS. 7h-7l could alternatively be constructed to inhibit light transmission during a non-voltage state. For example, the air gap between inner and outer strips 66 and 64 could comprise an odd integer multiple of one quarter wavelengths, causing destructive interference in the optical cavity during a no-voltage state. In that case, when a voltage is applied to movable mirror assembly 67 causing it to move relative to fixed layer 54 by one-quarter wavelength, or an odd multiple of one-quarter wavelengths, the light incident on the optical element will experience positive interference and be transmitted during an on-voltage state.

Because of the self-aligned formation of inner mirror strips 66 and the spacing between inner mirror strips 66 and the outer mirror strips 64, movable mirror layer 62 is optically equivalent to a smooth planar mirror surface when viewed from a direction perpendicular to the outer surface of the mirror. For example, providing a spacing of an integer multiple of one-half wavelength between the inner and outer movable mirror layers makes the staggered mirror assembly appear to be a continuous mirror from above. As such, the gaps 72, which help control air damping of the movement of assembly 67, are provided without substantially affecting the optical characteristics of the device. In a particular embodiment, the dimensions of air gaps 72 can be specified to provide a desired level of air damping. This may, for example, provide an additional mechanism for controlling the switching speed of the device.

The staggered structure formed by outer mirror strips 64 and inner mirror strips 66 results in exhaust gaps indicated at 72 in FIG. 7l. Exhaust gaps 72 allow for air within the optical cavity to be expelled when movable mirror layer 62 is deformed relative to fixed layer 54. If the gaps 72 were not present the movement of the movable mirror layer 62 would be dampened by the presence of air within the cavity. In the illustrated embodiment, the disclosure facilitates control of damping effects using exhaust gaps 72, without substantially affecting the optics of the device.

FIG. 7m is a perspective illustration which shows the actual placement of anchors 68 and 70 at the ends of an outer mirror strip 64 and an inner mirror strip 66. FIG. 7m also illustrates the positioning within the structure of the cross-section which was illustrated with reference to FIGS. 7h through 7l previously. It should be noted that FIG. 7m shows only a portion of the optical switch element. The outer and inner mirror strips 64 and 66, respectively, extend the length of the device and have anchor bodies (not explicitly shown) such as anchor bodies 68 and 70 on either end of each strip.

FIG. 7n is a greatly enlarged cross-sectional block diagram of another embodiment of an optical switch 720 constructed according to the teachings of the present disclosure. In this embodiment, the optical element 720 includes an anti-reflective layer 112 disposed outwardly from a substrate 110. Anti-reflective layer 112 is similar in structure and function to anti-reflective layer 12 discussed with reference to FIG. 1.

Optical element 720 further includes a fixed layer stack 119 disposed outwardly from anti-reflective layer 112. Fixed layer stack 119 is similar in function to fixed layer 14 of FIGS. 7h-7l. However, rather than implementing only a single fixed layer, fixed layer stack 119 utilizes multiple alternating layers of polysilicon and dielectric material. In this example, fixed layer stack 119 includes an interstitial fixed layer 123 disposed between a first fixed layer 121 and a second fixed layer 125. Additional alternating layers could be added without departing from the scope of the disclosure. Using one or more multilayer stacks to form fixed layer stack 119 provides an advantage of increasing the reflectivity of the assembly 119. This, in turn, increases the contrast ratio of the transmissive state of element 720, allowing for a higher finesse optical cavity, particularly where the cavity is a Fabry-Perot cavity.

In this example, first and second fixed layers 121 and 125 each have optical thicknesses of approximately one quarter wavelength of the optical signal to be switched. As a particular example, each of first and second fixed layers 121 and 125 could comprise approximately 1000 Angstroms of polysilicon doped sufficiently to render them at least substantially conductive. Interstitial fixed layer 123 could comprises approximately 2000 Angstroms of silicon nitride.

Optical device 720 further includes a movable mirror assembly 122 disposed outwardly from fixed layer stack 119. Movable mirror assembly 122 includes inner strips 126 and outer strips 124. In the illustrated embodiment, each inner strip 126 includes an inner polysilicon layer 130, an interstitial layer 132 disposed outwardly from inner polysilicon layer 130, and an outer polysilicon layer 134 disposed outwardly from interstitial layer 132. Polysilicon layers 130 and 134 may each comprise, for example, polysilicon that has been doped sufficiently to render it at least substantially conductive. An appropriate dopant may comprise, for example, phosphorous.

Interstitial layer 132 may comprise, for example, silicon nitride or other suitable dielectric material or combination of materials. In the example shown in FIG. 3, outer strip 124 includes an inner polysilicon layer 140, an interstitial layer 142 disposed outwardly from inner polysilicon layer 140, and an outer polysilicon layer 144 disposed outwardly from interstitial layer 142. Layers 140-144 of outer strip 124 in this example are similar in structure and function to layers 130-134, respectively, of inner strip 126. For example, layers 140 and 144 may comprise doped polysilicon and interstitial layer 142 may comprise silicon nitride.

In this example, each of layers 130-134 and 140-144 is formed to provide an optical thickness of one-quarter of a wavelength of the optical signal received by element 720. In this example, polysilicon layers 130, 134, 140, and 144 each comprises approximately 1000 Angstroms. Interstitial layers 132 and 142 each comprises approximately 2000 Angstroms of silicon nitride. Although the illustrated embodiment shows a moveable mirror assembly having a stack of three alternating polysilicon and interstitial layers, additional alternating layers of polysilicon and dielectric material could be used without departing from the scope of the disclosure. Like the multi-layer stacks used to form fixed layer stack 119, the multilayer stacks forming strips 124 and 126 provide increased reflectivity, better contrast ratios, and a higher finesse optical cavity.

Although embodiments of the moving mirror structure is exemplified in FIGS. 7h-7n, other modes of operation and other physical configurations can be used within the scope of the disclosure. For example, each of the mirror strips could be at the same level as adjacent strips. Alternately, each of the mirror strips could be at a position that is independent of the surrounding strips. In yet another embodiment, a group of mirror strips could be at the same level and each group could move in unison. The group can comprise a plurality of mirror strips.

The semiconductor chips of FIG. 7 are merely illustrative, and other kinds of chips can also used consistent with the disclosure. For example, another common chip is manufactured by Texas Instruments and is called either a digital micromirror device (DMD™) or digital light processing (DLP™) device. These are digital chips that rotate from one stop to another, and these can be rectangular or diagonal in shape. They are driven by a voltage that is encoded using a pulse width modulation coding format to obtain a range of gray scales, while the motion of the device is still digital.

Digital Display System

There are three main parts to a digital display system. The first is the physical exterior and user interfaces. This includes the housing or cabinet of the digital display system, the user interface units, the audio system, the screen, the cabinet back reflector and the connection to the IP pipe, whether that pipe is a fiber, a coaxial cable, a copper wire, or a wireless connection. The second main part of the digital display system is the optical digital display unit, which is primarily the light engine that generates the images to be viewed by the user. The third main part of the digital display system is the electronics, which includes the header processing unit, the CPU electronic processor unit, and the display processor unit.

Figure 8:
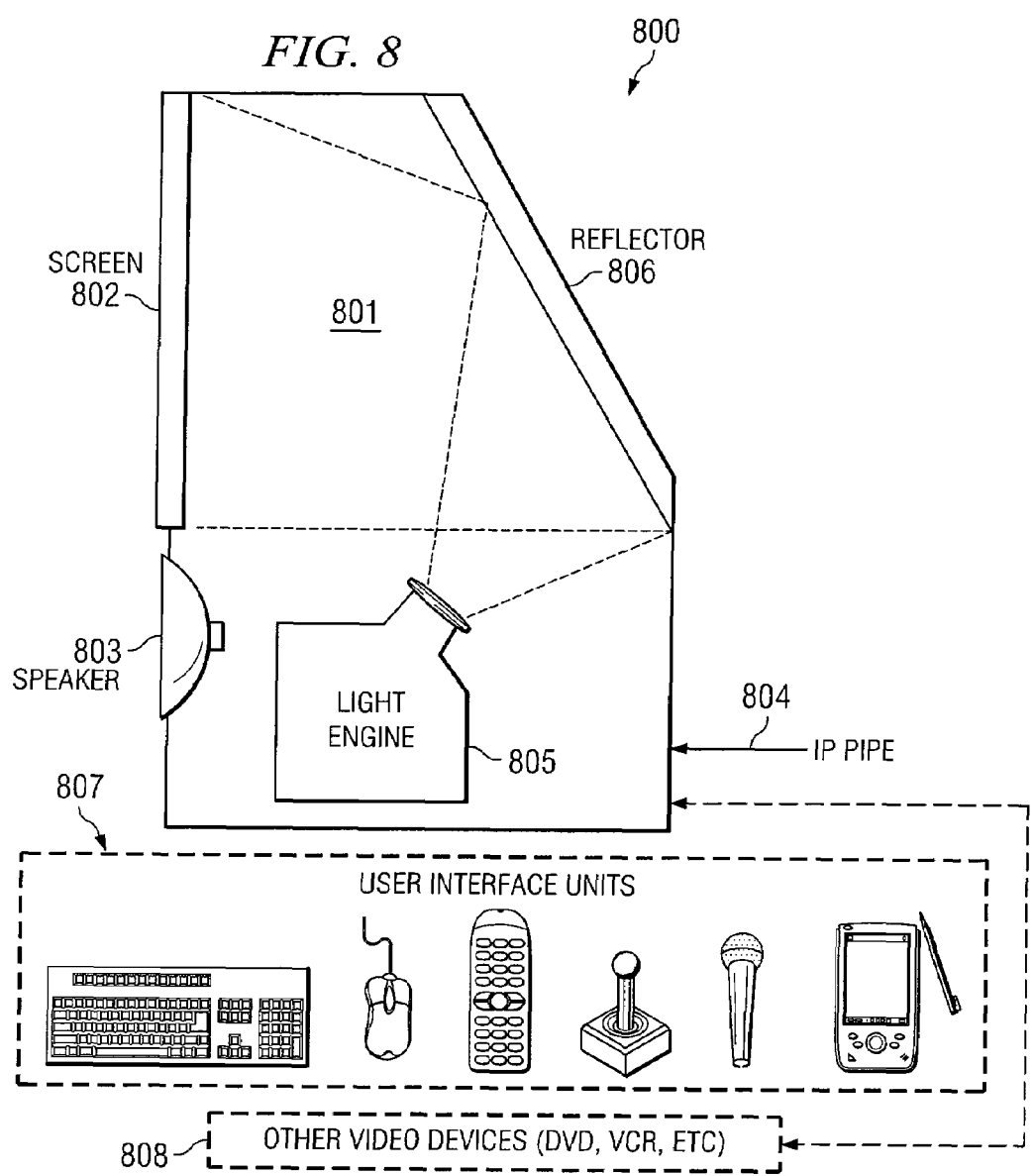
FIG. 8 is a diagram of the physical layout of a digital display system.

FIG. 8 shows one example of a physical lay-out of a digital display system 800, which illustrates the physical exterior and user interfaces. The cabinet holding the digital display system 801 can range in size depending on the viewing area size. The cabinet 801 includes a screen 802 that is typically rectangular in shape, a speaker 803 for the audio system, and an interface 804 for the IP pipe interconnection. In addition, the interface 804 could be coupled to other video devices 808, which can comprise DVD players, VCR's, TiVo, time shifting devices, or space shifting devices. The DVD can be of standard format, HD-DVD format or Blu-ray DVD format. The screen diagonal dimension can be in the range of 46 inches to 81 inches or more, as a non-limiting example. Inside the cabinet 801 will be the light engine 805 along with the electronics and a rear reflector 806 for reflecting the projected light from 805 to the screen 802. This arrangement can be referred to as rear projection. In addition, coupled to cabinet 801 can be a series of user interface units 807. The user interface units can include dials or buttons located directly on the cabinet. The user interface units can also include other external devices such as keyboards, mouse, remote control, joystick, microphones for data entry or voice control, a tablet, etc. The physical layout of FIG. 8 is only exemplary, and many other configurations and devices can be used consistent with the disclosure. For example, a hybrid display system may be implemented where, in addition to accommodating the IP pipe input, a more conventional television input can also be accommodated. Then, the input port 804 would also have a more conventional input, such as an antenna input or an RF input. Also, the electronic processor may be augmented with a more traditional television tuner system.

Figure 9:
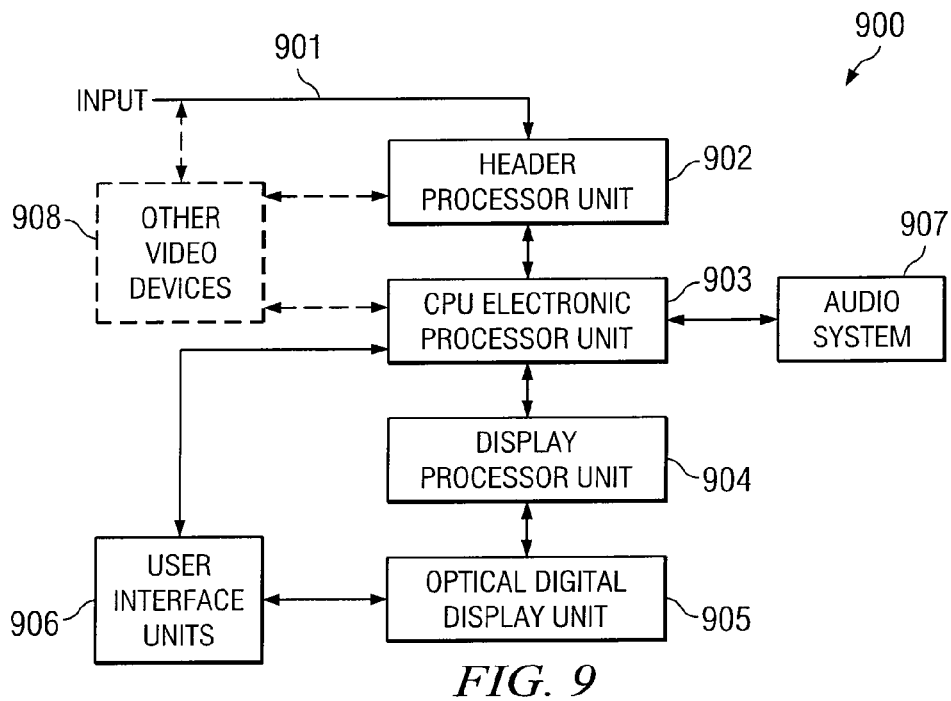
FIG. 9 is a block diagram of a digital display system.

FIG. 9 shows a block diagram of one example of a digital display system 900. In this example, input 901 comprises an IP data stream arriving on a fiber, a coaxial cable, a copper wire twisted pair or a wireless connection. The IP video signal is delivered to the digital display system 900 through input 901. The input 901 may also contain voice and data other than the video, which may or may not be used by the digital display system 900. For example, the digital display system 900 may be integrated with a telephone or video phone, which may then process voice over IP (VoIP) signals and interface to the user. The VoIP signals may also have text or voice messages that are placed on the display. In another example, the digital display system 900 may be integrated with a computer, which can then provide access to the internet, web sites, electronic mail, etc. In addition, the input 901, the header processor unit 902, and/or the CPU electronic processor unit 903 could be coupled to other video devices 908, which can comprise DVD players, VCR's, TiVo, time shifting devices, or space shifting devices. The DVD can be of standard format, HD-DVD format or Blu-ray DVD format.

The disclosure describes, amongst other things, a video-processing digital display system 900 and a system that is integrated with a voice system and a computer. Other combinations of appliances can also be integrated with the digital display system 900. However, in the description below, only the video section will be highlighted.

The input 901 is coupled to a header processor unit 902, which looks at the header in the arriving IP packets to decide which packets are to be downloaded to the digital display system 900. One example of a header processing unit 200 is shown in FIG. 2. The header processing unit also comprises input and output buffers, which are coupled to the input line 901. The header processor unit 902 is coupled to a CPU electronic processor unit 903, which processes the incoming datagrams that are downloaded based on the header information. The functions of the CPU include decompressing the data, reordering the packets, streaming the data continuously, time-shifting the data and generating outgoing messages. The CPU electronic processor unit 903 is also coupled to user interface units 906 that can receive inputs from the user from a number of inputting devices. Furthermore, the CPU electronic processor unit 903 can also be coupled to the audio system 907, which can include a number of sounding devices such as speakers and surround sound systems.

The data from the CPU electronic processor unit 903 is further coupled to a display processor unit 904, which processes the digital video data into a format and drive appropriate to the technology used in the optical digital display unit 905. In other words, the display processor unit is specific to the hardware used for the display. Technologies used for the optical digital display unit 905 can include digital micromirrors, liquid crystal on silicon, LCD, plasma and CRT, just as a few examples.

The optical digital display unit 905 comprises the optics that forms the basic light engine. The optical digital display unit 905 is coupled to the display processor unit 904 to receive control signals, and it may additionally be coupled to power supplies and bias circuits. Furthermore, the optical digital display unit 905 may be coupled to the user interface units 906. The optical digital display unit modulates the light from a light source, such as a lamp or a laser, to create color images that are projected onto the screen and interfacing to the user.

The digital display system 900 of FIG. 9 is one example of the interconnection between the different functional block units in a typical digital display system. However, not all the boxes are always required, there may also be additional units, and the interconnection between the units can also be different than illustrated in the one example of FIG. 9. Furthermore, the display system 900 can be modified to also accept more conventional television signals, which might come from an antenna or RF input. For example, the display system 900 might be a hybrid that can accommodate IP video signals as well as conventional television channels. The IP video signals would be handled using the set-up in FIG. 9, while the conventional television channels would be handled with a more conventional television tuner.

Figure 10:
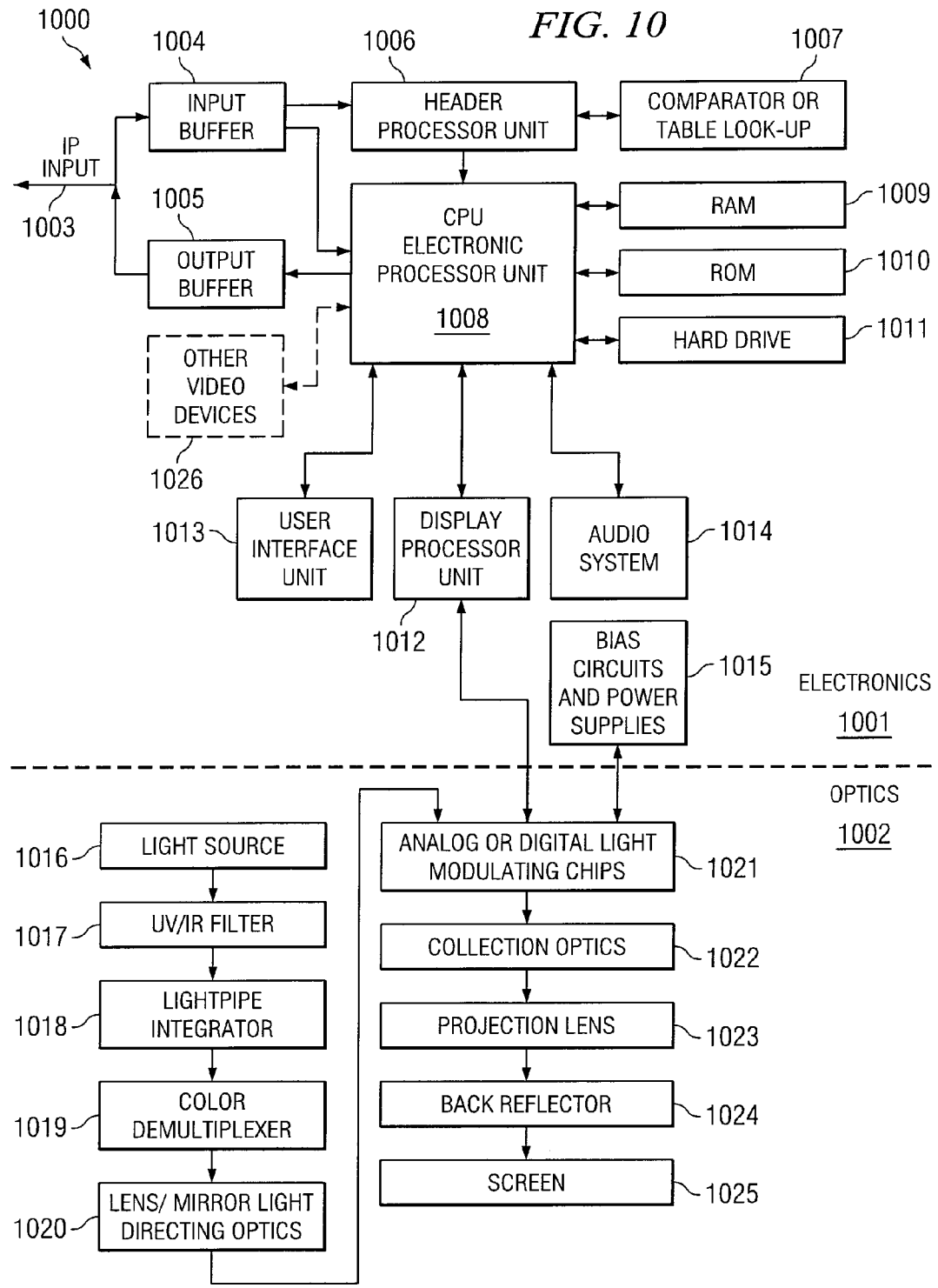
FIG. 10 is a block diagram of the details of one embodiment of the electronics and optical building blocks of a digital display system.

FIG. 10 illustrates one embodiment of the digital display system 1000. The top part 1001 (above the dotted line) is primarily electronics, while the bottom part 1002 (below the dotted line) is primarily optics or opto-electronics. The IP datagrams and data stream enters through the input 1003. The input can be on a fiber, a coaxial cable, a copper wire twisted pair, or a wireless link, for example. In addition, the input 1003, header processor 1006 and/or the CPU electronic processor 1008 could be coupled to other video devices 1026, which can comprise DVD players, VCR's, TiVo, time shifting devices, or space shifting devices. The DVD can be of standard format, HD-DVD format or Blu-ray DVD format.

The input 1003 is coupled to an input buffer 1004 and an output buffer 1005. The input buffer 1004 is coupled to a header processor 1006, which examines the header in the IP packets to determine which packets should be downloaded. The header processor 1006 can use a comparator 1007 or a table look-up to process the packet headers. The header processor 1006, input buffer 1004 and output buffer 1005 are coupled to a CPU electronic processor 1008, which processes the packets that are to be downloaded to the digital display unit.

The CPU electronic processor 1008 is coupled to RAM 1009, ROM 1010, and hard drive 1011 memory units. The header processor 1006 and CPU 1008 can either be separate units, or alternatively they could be integrated into one chip, daughter board, or electronic sub-system. The packets processed by the CPU electronic processor 1008 are then processed into the display device specific drive and format in the display processor unit 1012.

The header processor 1006 and CPU electronic processor 1008 perform common IP packet processing functions, and, therefore, are basically device independent. The display processor unit 1012, on the other hand, formats the data and provides outputs that are specific to the particular technology used in the analog or digital light modulating chips 1021. In addition to the digital processor unit 1012, there may be also bias circuits and power supplies 1015 coupled to the analog or digital light modulating chips 1021.

The CPU electronic processor 1008 can also be coupled to a number of input and output devices. For example, the CPU 1008 can be coupled to user interface unit 1013, which can comprise a number of devices including buttons or knobs, remote controls, keyboards, mouse, joystick, tablets, and microphones. Moreover, the CPU 1008 can be coupled to a audio system 1014, which can comprise a number of devices including speakers and surround sound systems.

The optical engine 1002 part of the digital display system 1000 takes the light from a light source 1016 and modulates it based on the electronics 1001 and projects the modulated light onto a screen 1025. The light source 1016 can comprise one or more types of light sources, such as light bulbs, lamps, halogen lamps, zenon lamps, argon lamps, one or more laser diodes, or one or more solid state lasers. The light source 1016 may also include a back reflector to direct the light primarily in the forward direction.

The cost of the light source 1016 is reduced if a broadband light source is used, such as a lamp or a bright light bulb. Although the desired light is in the visible (e.g., typically 400 to 800 nm), the lamps and broadband light sources can also have significant energy in the infrared (IR) and ultraviolet (UV). In some cases, the IR light can create unnecessary heating in the display system. The UV light can cause degradation of plastic and glass parts or optics used in the light engine. In other cases, the UV light can additionally cause damage to the light modulating chips 1021. Therefore, when a broadband light source 1016 is used, it is advantageous to use one or more UV/IR filters 1017 that substantially direct to the system the visible light while blocking or directing in a different direction the UV and IR light. The UV/IR filters 1017 can be transmissive or reflective, and they can advantageously be combined with the light source 1016. Various embodiments of the UV/IR filters 1017 include dielectric filters, absorptive filters, dichroic filters, and coatings.

Although bright light bulbs or lamps can be inexpensive, they have a problem of having a filament that could lead to non-uniform illumination of the light modulating chips 1021. Therefore, it is also advantageous to use an integrator or light pipe 1018 to mix the light to remove the filament image and make the light more uniform across the cross-section. Examples of the integrator 1018 include light pipes or light waveguides, one or more lenslet arrays, an integrating rod, or a highly multimode pipe or waveguide.

The output of the light source 1016 is coupled to a color demultiplexer 1019 to separate the white light into blue, green, and red (the three primary colors for visible light). The demultiplexer 1019 can separate the three colors sequentially in time or in different spatial paths. Examples of the color demultiplexer 1019 include color wheels, color discs, and one or more dichroic mirrors or filters.

The light from the light source 1016 can be directed through one or more of the components 1017, 1018, and 1019 to the analog or digital light modulating chips 1021 using one or more lens and/or mirrors light directing optics 1020. The light can be collimated or can be focused through one or more of the components. Although a specific order of the UV/IR filter 1017, light pipe integrator 1018, and color demultiplexer 1019 is shown in FIG. 10, these components can actually be in any different configuration or order. Also, although the lens/mirror light directing optics 1020 is shown as a unit, the optical components in 1020 can be distributed throughout the optical engine and can be intermixed with 1017, 1018 and 1019.

The light from the light source 1016 is modulated with the data from the electronic system 1001 in the analog or digital light modulating chips 1021. The modulating chips 1021 can include any one of a number of technologies, such as micro-mirror devices, digital micro-mirror devices, liquid crystal display devices, or liquid crystal on silicon devices. The modulating chip 1021 may operate in transmission or reflection. The modulator chip 1021 is coupled to the display processor unit 1012 and bias circuits and power supplies 1015, which provide voltages and signal formats appropriate to the particular chip technology. The modulating chips can exemplary be a 2-D array of devices. Examples of the number of pixels from the modulating chips include 1280×720 (so-called 720p) and 1920×1080 (so-called 1080p). The devices can be address individually, or they can be addressed one row or column at a time.

In some embodiments, the analog or digital light modulating chips 1021 may additionally use a second wobbling mirror to image multiple image pixels onto the same device. As an example, the wobbling mirror can be a separate mirror that wobbles at a frequency, such as at 120 Hz. The wobbling mirror, for example, has two pixels arriving spatially separated at two angles onto the modulating element, which then transmit or reflect from the modulating element at to different angles. The advantage of the wobbling mirror is that multiple pixels can share the same modulating element, meaning that fewer modulating elements are required for the display, thereby reducing the cost. For example, a display with 1920×1080 pixels can be implemented with a chip with 960×1080 pixels if a wobbling mirror arrangement is employed. Many other improvements in modulating chips can be used in the digital display system.

The pixels of light from the modulating chips 1021 are then collected using collection optics 1022, which can include any number of lenses, mirrors, and prisms. A projection lens 1023, which can actually be a cascade of lenses, is then used to expand the image from the modulating chips 1021. In some embodiments, the collection optics 1022 and projection lens 1023 can be combined into the same unit. The modulated light is then bounced off a back reflector 1024, which is located on an inner wall of the cabinet housing, and the image is then reflected to a screen 1025. The purpose of the back reflector is to make more compact the size of cabinet required for the size of screen used. This configuration is known as a rear projection configuration. The back reflector can be one or more reflective surfaces, which can either be flat or curved. The size of the screen can, as an example, range diagonally from 46 to 81 inches or more.

The digital display system 1000 as illustrated has a number of advantages over current alternatives. Currently, the IPTV signal is received by a router, which then sends it to a set-top box, which generates an RF signal to send to a conventional television set. If the television set uses a digital display technology such as digital micro-mirrors, then the analog input is once again converted to a digital signal for the digital display technology. Beyond having three separate boxes that need to be properly interconnected and inter-operable, there are two or more stages of digital-to-analog and analog-to-digital conversion.

The digital display system 1000 either eliminates or minimizes the need for digital-to-analog and analog-to-digital conversion. The combination of the header processor 1006, CPU electronic processor 1008 and optical engine 1002 reduces numerous unnecessary intermediate conversions and redundant functions of the router/set-top-box/television system. Therefore, the digital display system 1000 can potentially have better fidelity, because there is less loss of fidelity in intermediate conversions. Furthermore, the digital display system 1000 can potentially have less latency or delay, since several of the intermediate processing steps and conversions are eliminated. In addition, few parts reduce the cost and size of the digital display system 1000.

Compared with a conventional television set, the complexity and cost of the digital display system 1000 can also be reduced. For example, a conventional television receives a bandwidth of signal that is 550 MHz or more, and a tuner is used to filter and a mixer is used to translate the signal to a baseband signal. For the digital display system 1000, only a baseband signal with a bandwidth of a few megahertz to tens of megahertz is required. For example, a NTSC channel occupies about 6 MHz uncompressed, while a HDTV channel occupies about 30 MHz uncompressed. Therefore, lower bandwidth electronic components can be used in the digital display system 1000. In addition, mixers are not required, since the incoming signal is baseband. Moreover, the tuner function is replaced by the header processor 1006, since the channels are now selected based on the header rather than a physical frequency.

Another way in which the digital display system 1000 reduces the complexity and cost of the television is in the number of tuners required. To implement functions such as picture-in-picture (PIP), a conventional television actually uses a plurality of tuners. On the other hand, in the digital display system 1000 the header processor 1006 needs simply to accept packets with different headers, but the hardware does not change. In principle, several channels can be simultaneously displayed in a digital display system 1000, just as MICROSOFT WINDOWS can simultaneously display a number of windows in a computer today.

The digital display system 1000 also opens up new opportunities that current conventional televisions are not capable of. For example, since the digital display system 1000 accepts IP packets, it can become a triple play device because voice, video and data can all be placed in IP packets. Therefore, the digital display system 1000 can integrate some of the functions of the telephone by accepting VoIP packets, and it can integrate some of the functions of a computer or terminal by accepting data packets. Moreover, if the digital display system uses a digital light modulating technology, such as digital micro-mirrors, then an all-digital display system 1000 can be implement with a very high quality and fidelity of display. In the all-digital display, the incoming data is digital and the light modulation technology is digital, so the modulated light displayed on the screen 1025 can be very sharp without analog/digital conversions.

The IP stream input to the digital display system can be delivered in a number of different networks. For example, the IP signal may be delivered by an FTTx network, a HFC network, or a DSL network. These are only particular examples, and the IP stream can be delivered by many other types of networks.

Despite these advantages of the packet based digital display system, there may be a more gradual transition to packet based systems, in part to accommodate the legacy systems. Therefore, one generalization of the digital display system in 1000 is a hybrid display system, which is capable of handling conventional NTSC and/or HDTV channels as well as IP packet based video signals. For example, there can be a more traditional input from an antenna or RF input in addition to the IP input. Also, in parallel with the packet-based electronics, there can be a more traditional NTSC and/or HDTV tuner to process the traditional television inputs. In one embodiment, the more traditional tuner might handle broadcast television inputs, while the IP packet input can handle more specialized applications, such as video-on-demand. Thus, the hybrid display system embodies the disclosures described for the IP video digital display system plus more conventional television display systems.

IP Delivery Network

Figure 11:
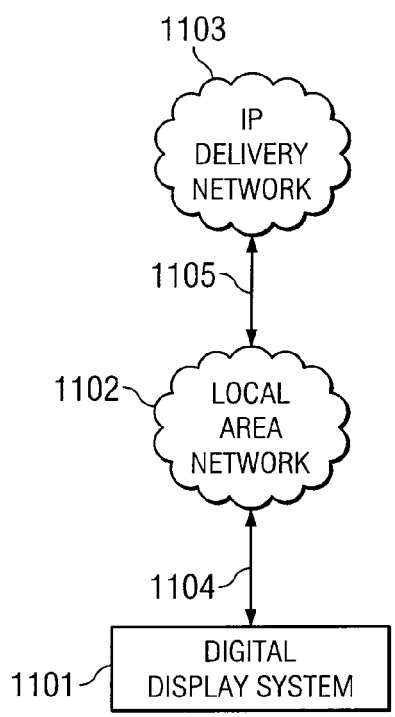
FIG. 11 is a block diagram of a communication and display system.

A block diagram of a communication and display system is illustrated in FIG. 11. The input to the digital display system 1101 may be coupled to an IP delivery network 1103, which can bring the IP signals from a video distribution network. There may additionally be a local area network 1102 as an intermediary network between the digital display system 1101 and the IP delivery network 1103. The interconnection between the IP delivery network and the local area network 1105 as well as the interconnection between the local area network and the digital display system 1104 can be optical fiber, coaxial cable, copper wire twisted pair, wireless, or any other of a number of interconnection media.

Figure 12:
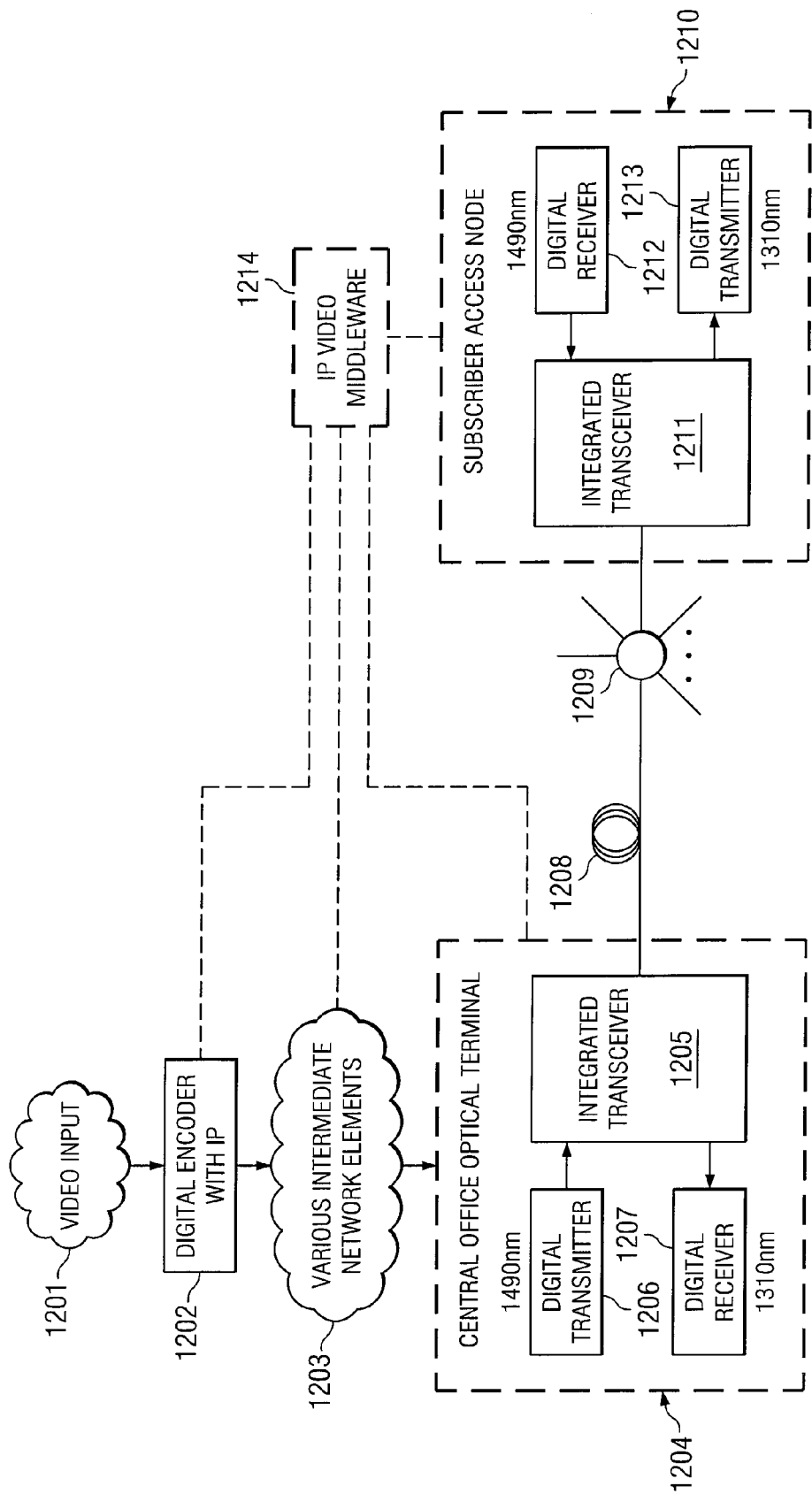
FIG. 12 is an example of an IP delivery network.

One example of the IP delivery network is illustrated in FIG. 12. The video input 1201 may be from a television station or any other video creation outlet. The video input is passed through a digital encoder 1202, which is capable of encoding the video in an IP format packet, for example as illustrated in FIG. 1. The digital encoder 1202 can include any number of computational tools such as processors, buffers, analog/digital converters, and routers. The IP video signal is then coupled to any number of intermediate network elements 1203, such as would be present in a long-haul, wide area, regional, or metropolitan area network, or any other video distribution network.

One or more of the network elements 1203 are then coupled to at least one central office optical terminal 1204. The optical terminal comprises an integrated transceiver 1205, which is coupled to a digital transmitter 1206 and a digital receiver 1207. The digital transmitter 1206 is capable of producing a down-stream data signal having one or more wavelengths in the 1390-1650 nm wavelength range. In one particular embodiment, the down-stream data signal comprises a 1490 nm wavelength. The digital receiver 1207 is capable of receiving an up-stream data signal having one or more optical signal wavelengths in the 1240-1390 nm wavelength range. In one particular embodiment, the up-stream data signal comprises a 1310 nm wavelength. The integrated transceiver 1205 also includes a wavelength division multiplexer (WDM) for separating the up-stream and down-stream wavelengths.

The optical terminal 1204 is coupled to a fiber-optic line 1208, which is subsequently coupled to one or more optical splitters 1209. The fiber-optic line 1208 can be of any length, and in a preferred embodiment the length would be 20 km or less. The one or more splitters 1209 can comprise one or more power dividers, which are devices that share substantially the same wavelengths but divide the power between the different output ports. In a preferred embodiment, the optical splitter 1209 can be a 1×2, 1×4, 1×8, 1×16, 1×32, 1×64, or other coupler. Alternatively, the optical splitter 1209 can be a cascade of couplers.

At least one output port of the optical splitter 1209 is coupled to a subscriber access node 1210. The access node 1210 includes an integrated transceiver 1211 that is coupled to a digital receiver 1212 capable of receiving the down-stream data signal having one or more wavelengths in the 1390-1650=n wavelength range. The access node 1210 also includes a digital transmitter 1213 capable of communicating an up-stream data signal having one or more wavelengths in the 1240-1390 nm wavelength range. In this particular embodiment, the digital receiver 1212 receives the down-stream data signal having a 1490 nm wavelength and the digital transmitter 1213 generates the up-stream data signal having a 1310 nm wavelength. The integrated transceiver 1211 can comprise a WDM for separating the down-stream and up-steam wavelengths.

The digital transmitters 1206 and 1213 comprise drive electronics as well as laser diodes and/or modulators. Laser diodes can include distributed feedback (DFB) lasers, distributed bragg reflector (DBR) lasers, multi-mode lasers and/or single-mode lasers. In this particular embodiment, the digital receivers 1207 and 1212 comprise an electronic receiver as well as an optical detector for the optical to electrical conversion. The optical detector may include a PIN detector or an avalanched photo-diode. The devices used in the central office optical terminal can be different than the devices used in the subscriber access node.

To minimize cross-talk, the down-stream data in a preferred embodiment can be at a wavelength near 1490 nm. This means that the down-stream data can actually be at an optical wavelength in the range of 1390 nm to 1650 nm. The up-stream data in a preferred embodiment can be at a wavelength near 1310 nm. This means that the up-stream data can actually be at an optical wavelength in the range of 1240 nm to 1390 nm. One advantage of converting the video to an IP data stream is that a video overlay network, which typically operates at a third wavelength, is no longer required. Moreover, the video overlay network typically carries analog data, which has much more stringent signal-to-noise ratio requirements. Therefore, the IP video has the advantage of permitting further transmission and/or more tolerance to loss and distortion by being in a digital format.

Different formats and protocols can be used for the down-stream and up-stream data signals. Also, the down-stream data signal can contain a combination of voice, data, and video traffic. If there is a combination of different types of traffic on the network, then the IP video data should be assigned appropriate quality of service (QoS) to insure timely delivery of packets. In a preferred embodiment, the down-stream and up-stream data signals can be in an IP format. Several examples of IP format include TCP/IP and UCP/IP. In another embodiment, the data can be in an asynchronous transfer mode (ATM) format. In yet another embodiment, the data can be in a gigabit passive optical network (GPON)

frame format, such as generic encapsulation method (GEM). In still another embodiment, the data can be in an Ethernet data format. Some of these formats may be cell based, while others may be variable length packet based. These as well as other data formats are compatible with the disclosure.

Different protocols can also be used for the up-stream and down-stream data signals. In one embodiment, the down-stream data signal can be time-division multiplexed (TDM), while the up-stream data signal can be time-division multiple access (TDMA). Using TDMA in the up-stream direction minimizes the possibility of collisions between different subscriber access nodes sharing the same network. In another preferred embodiment, Ethernet protocols can be used in the up-stream and down-stream data signals. Some of these protocols can be packet or cell based, while others can be circuit based. Some of these protocols can be connection-oriented, while others are connection-less oriented. These and other protocols are compatible with the disclosure.

The up-stream and down-stream data signals can be at a variety of data rates. For example, the up-stream and down-stream data rates can be approximately 155 megabits-per-second (Mbps), 622 Mbps, 1.24 gigabits-per-second (Gbps) and 2.48 Gbps. The up-stream and down-stream transmissions may be symmetric, or they may be asymmetric with different rates in the two directions. For the asymmetric case, the down-stream speed is usually higher than the up-stream speed. Although the data rates, formats, and protocols are discussed here by way of example, any other rates, formats and protocols can be used within the scope of the disclosure.

Various hardware units also interface with an IP Video Middleware 1214. For example, there may be a control network coupled to the digital encoder 1202, optical terminal 1204 and access node 1210. That controller can implement the IP video middleware. The IP video middleware can comprise hardware as well as software or firmware. The software can include various operating systems such as MICROSOFT WINDOWS, LINUX, or any other IP that is used with set-top boxes. The IP video middleware may also include a medium access control (MAC) protocol.

FIG. 12 is a block diagram of one example embodiment of the IP delivery network. It should be clear that other types of delivery networks can be used consistent with the disclosure. For example, the digital display system can be a hybrid display system, which can handle IP packets as well as more conventional NTSC or HDTV inputs. In this case, the IP delivery network of FIG. 12 may have a video overlay network at a different optical wavelength, and the overlay network might handle analog video signals as an example. This video overlay network may also be coupled to optical amplifiers, which can boost the overlay network signal to at least partially compensate for the transmission and splitting losses.

As another embodiment of the IP delivery network, a higher performance network may be required as the data rates increase, such as when the data rate is about 2.5 gigabits-per-second, 10 gigabits-per-second or higher. For these higher data rates, it may be advantageous to replace the optical power splitter 1209 by a wavelength division multiplexer and/or demultiplexer. For example, in this case one or more subscriber access nodes might be serviced by a particular optical wavelength, and different branches of the splitter might receive different optical wavelengths. This case begins to emulate more of a point-to-point type wavelength division multiplexed system, such as is used typically in long-haul or metropolitan area networks.

Figure 13:
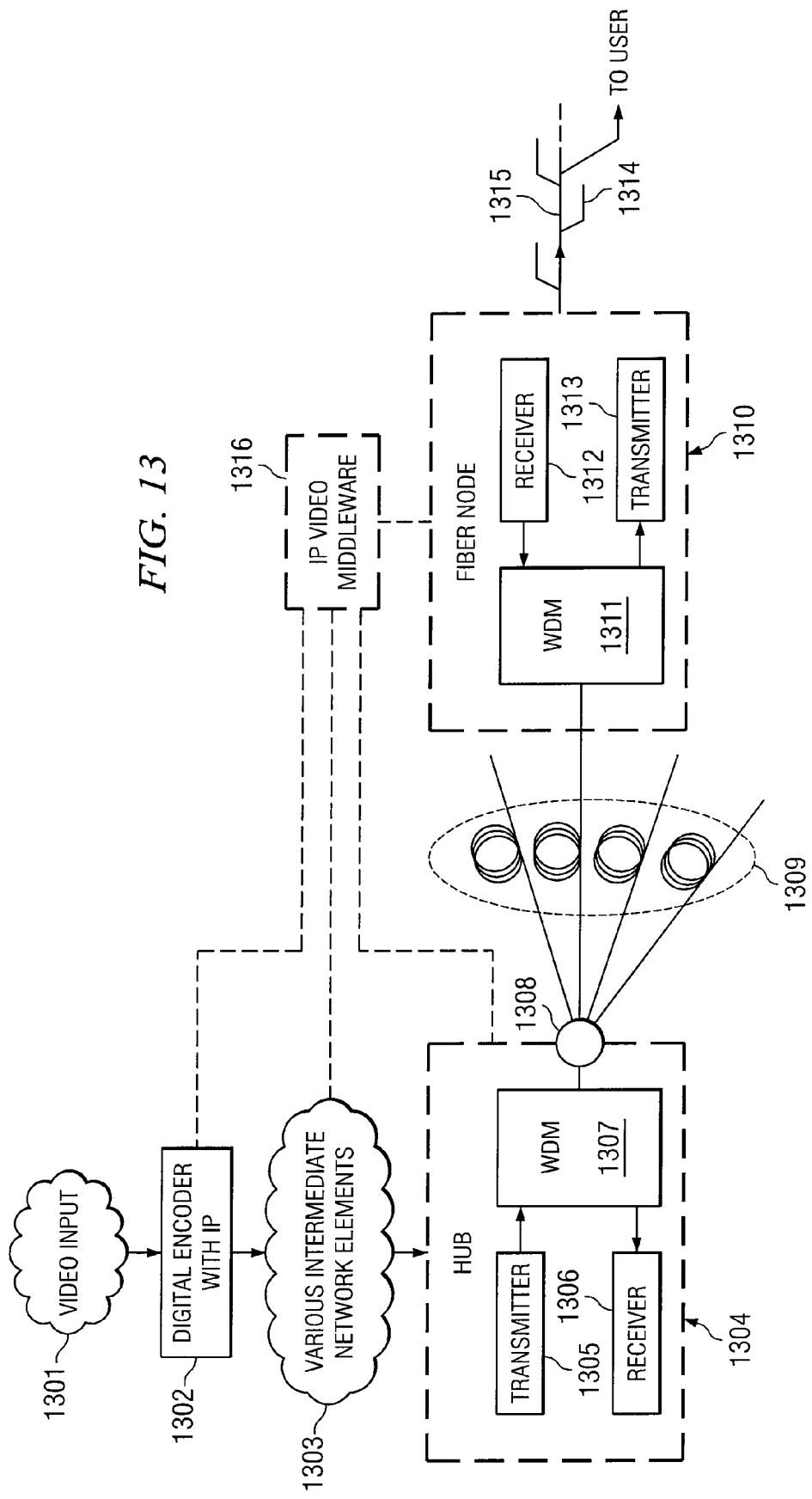
FIG. 13 is an example of a hybrid fiber/coax IP delivery network.

FIG. 13 illustrates an alternative IP delivery network, which is a hybrid of fiber and coaxial lines. Alternatively, the distribution network illustrated in FIGS. 12 and 13 could also be copper twisted-pair instead of coaxial lines. The video input 1301 is coupled to a digital encoder with IP 1302 to form the IP packets containing the video. The digital encoder forms IP packets with header and payload and takes the continuous video stream and breaks it into a series of variable sized packets. Moreover, the digital encoder may comprise one or more analog-to-digital converters.

The digital encoder 1302 is coupled to various intermediate network elements 1303, such as existing in long-haul, metropolitan area, or regional networks. At least part of the digital encoder signal is coupled to a hub 1304, which comprises a transmitter 1305 and a receiver 1306 coupled to a WDM 1307. The WDM is coupled to a power distribution coupler 1308, which is also coupled to a fiber distribution network 1309. The fiber distribution network can be of any length, although in a preferred embodiment the length can be less than or equal to 20 km.

At least one end of one of the fiber distribution tree network is coupled to a fiber node 1310, which also comprises a WDM 1311, a receiver 1312 and a transmitter 1313. The fiber node is coupled to a coaxial distribution network 1314. Although FIG. 13 shows the coaxial distribution network 1314 as a tree structure, any other architecture for the distribution network can also be used. Moreover, the coaxial distribution network can comprise amplifiers 1315 to boost the signal to compensate for transmission and distribution losses.

For this network the down-stream signal travels from the hub 1304 to the fiber node 1310, while the up-stream signal travels from the fiber node 1310 to the hub 1304. Coarse wavelength-division-multiplexing may be used for the up-stream and down-stream signals, so that one of the signals is around 1500 nm while the other is around 1310 nm. As before, a signal around 1500 nm can comprise a wavelength in the range of 1390 to 1650 nm, while a signal around 1310 nm can comprise a wavelength in the range of 1240 nm to 1390 nm. The fiber distribution network may also in one embodiment use optical amplifiers to compensate for the transmission and distribution losses.

A control network to operate the IP video middleware 1316 may also be advantageously used with the IP delivery network. The IP video middleware may comprise a combination of hardware, software and firmware, and it may operate a number of operating systems including Microsoft Windows and Linux. The IP video middleware 1316 can be coupled to the digital encoder 1302, one or more of the network elements 1303, the hub 1304 and the fiber node 1310.

Local Area Network

Figure 14:
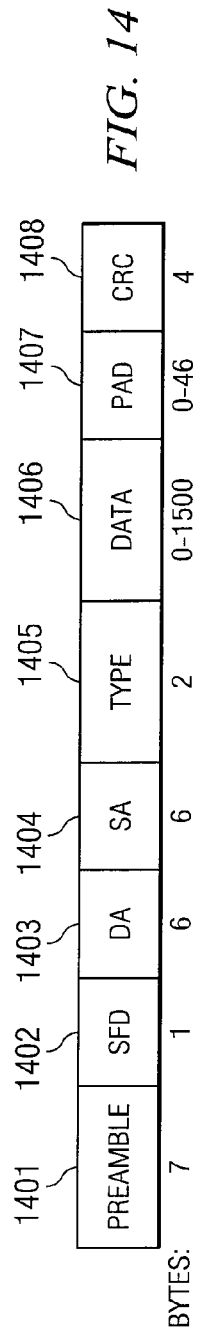
FIG. 14 is an example of an Ethernet frame format.
Figure 15:
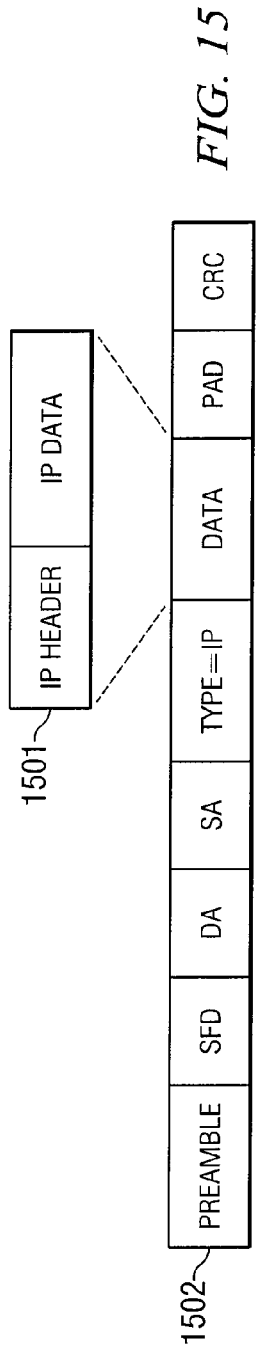
FIG. 15 is an example of encapsulation of IP data onto an Ethernet frame format.

Beyond any of the above IP delivery networks, the IP stream may additionally be carried by a local area network before coupling to the digital display system. In one embodiment, the signal from the IP delivery network can be coupled to the user through an Ethernet network. The Ethernet network can comprise a combination of fibers, coaxial cable, and copper wire twisted-pair. For carrying the data over the Ethernet, the data is encapsulated into an Ethernet frame format, as illustrated in FIG. 14. FIG. 15 illustrates an IP packet 1501 being encapsulated into the Ethernet frame 1502, which means that the packet is inserted into the data section. The data of the Ethernet frame can comprise up to 1500 bytes of data.

The Ethernet frame format of FIG. 14 comprises a number of elements. The preamble 1401 comprises 7 bytes and is used to train the clock recovery circuit. The start of frame delimiter SFD 1402 comprises 1 byte and indicates the start of frame. The destination address DA 1403 and sender address 1404 each comprise 6 bytes and may include a 48-bit globally unique address assigned by the manufacturer. One or both addresses can comprise whether it is a unicast or multicast, and if it is a local or global address. The type 1405 comprises 2 bytes and indicates the protocol of the encapsulated data. For example, for IP packets the Type=0x0800. The data 1406 can comprise up to 1500 bytes. Then, the pad 1407 can comprise up to 46 bytes, and it comprises zeroes to ensure a minimum frame length. Finally, the cyclic redundancy check CRC 1408 is 4 bytes long and is a check sequence to detect bit errors. The Ethernet encapsulation shall be removed when the data exist the Ethernet network and is supplied to the user.

Figure 16:
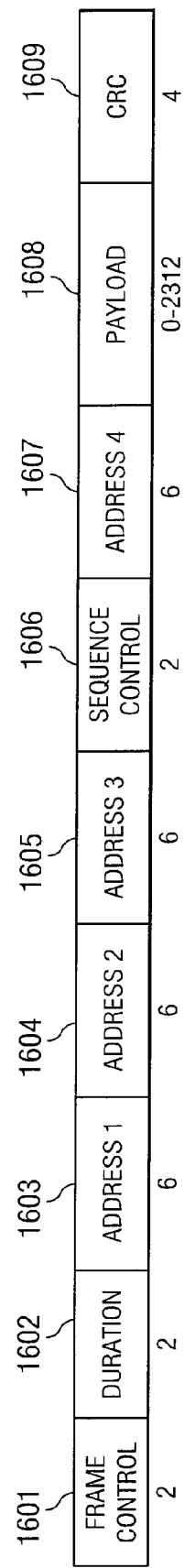
FIG. 16 is an example of an 802.11 frame with addressing.

Another embodiment of the local area network uses a wireless network, such an IEEE 802.11 local area network. A switch or router is coupled to a basic service set or cell comprising a wireless host and an access point (AP) base station. As with Ethernet, the 802.11 network encapsulates the data in the local area network. FIG. 16 shows an exemplary 802.11 frame. The frame control 1601 comprises 2 bytes, followed by the duration 1602 which also comprises 2 bytes. The address # 1 1603 comprises 6 bytes, and it is the MAC address of the wireless host or AP to receive this frame. The address # 2 1604 comprises 6 bytes, and it is the MAC address of the wireless host or AP transmitting this frame. The address # 3 1605 comprises 6 bytes, and it is the MAC address of the router interface to which the AP is coupled. The sequence control 1606 comprises 2 bytes. This is followed by address #4 1607, which comprises 6 bytes and is used only in the ad hoc mode (e.g., hosts only). The payload 1608 can comprise up to 2312 bytes. Finally, the CRC 1609 comprises 4 bytes.

Although Ethernet and 802.11 local area networks have been described for coupling the IP delivery network to the user with the digital display system, any other type of local area network can be used within the scope of the disclosure. Also, the digital display system can be directly coupled to the IP delivery network through a fiber, a copper wire, a coaxial cable or a wireless link.

Although the disclosure has primarily focused on a packet-based digital display system, it should be understood that a hybrid display system can also be used. In the hybrid system, a more tradition television signal can be accepted in addition to the IP packet input. The more traditional television signal can be handled by NTSC or HDTV tuners, while the IP packet input can be handled as described above. One benefit of the hybrid display system is that it is compatible with legacy equipment, and it can provide a more gradual transition to packet based video. Also, in some cases it might be easier to broadcast channels in NTSC or HDTV format, while it might be easier to handle special services such as video-on-demand in IP packet format.

Although the present disclosure has been described in several embodiments, a myriad of changes, variations, alterations, transformations, and modifications may be suggested to one skilled in the art, and it is intended that the present disclosure encompass such changes, variations, alterations, transformations, and modifications as falling within the spirit and scope of the appended claims.

What is claimed is:

1. A display device comprising:
    an electronic processor capable of receiving and processing a digital input signal, the digital input signal comprising an internet protocol format having at least a header and a payload, wherein the digital input signal is substantially free from digital-to-analog conversions while being processed by the electronic processor and wherein at least a portion of the payload comprises video information, the electronic processor comprising:
        a header processing unit capable of processing at least a portion of the header of the digital input signal;
        a central processor unit capable of receiving the payload and the processed portion of the header of the digital input signal, wherein the central processor unit is coupled to one or more memory devices and one or more buffering devices; and
        a display processor unit coupled to the central processor unit, wherein the display processor unit generates an electronic control signal based at least in part on the portion of the payload that comprises the video information of the digital input signal;
    a light processing unit capable of receiving at least a portion of the electronic control signal from the display processor unit and modulating light based at least in part on the portion of the electronic control signal, wherein the light processing unit comprises:
        a light source capable of generating one or more optical signals;
        an optical filter coupled to the light source, the optical filter operable to receive the one or more optical signals generated by the light source and to filter at least infrared and ultra-violet portions of the one or more optical signals;
        a light integrator coupled to the light source, the light integrator operable to receive the one or more optical signals and to equalize any spatial distribution of the one or more optical signals;
        a color demultiplexer coupled to the light integrator, the color demultiplexer operable to receive the one or more optical signals and to separate the one or more optical signals into one or more bands of wavelengths;
        a light directing optics coupled to the color demultiplexer, the light directing optics comprising one or more lenses and one or more mirrors, the light directing optics capable of shaping and directing the one or more bands of wavelengths;
        one or more light modulating chips coupled to the light directing optics and to the display processor unit, the one or more modulating chips operable to receive one or more of the bands of wavelengths from the light directing optics and to modulate the one or more of the bands of wavelengths based at least in part on the electronic control signal; and
        a collection optics operable to receive the modulated bands of wavelengths and to communicate the modulated bands of wavelengths for display; and
    one or more display screens operable to receive the modulated bands of wavelengths communicated from the light modulating chips and to display the modulated bands of wavelengths.

2. The display device of claim 1, wherein at least some of the one or more light modulating chips are selected from the group consisting of a digital micro-mirror device, a liquid-crystal-on-silicon device, and a liquid crystal display device.

3. The display device of claim 1, wherein the light processing unit is a rear projection display or television.

4. The display device in claim 3, further comprising a user interface unit coupled to the central processor unit, at least a fraction of the video information comprising an advertisement, and wherein the advertisement is based at least in part on an input entered into the user interface unit.

5. The display device of claim 4, wherein the advertisement is unicast to the display device.

6. The display device of claim 1, wherein the video information is multiplexed with voice and data.

7. The display device of claim 6, wherein at least one of the one or more display screens comprises a plurality of virtual windows originating from the same light processing unit and wherein different virtual windows communicate each of at least a fraction of voice, data, and video information.

8. The display device of claim 1, wherein the display processor unit is coupled through a wireless connection to the electronic processor.

9. The display device of claim 1, wherein the display device integrates substantially the functions of a router, a set-top box, an external hard drive, and a display.

10. A light processing device comprising:
an electronic processor capable of receiving and processing a digital input signal, the digital input signal comprising an internet protocol format having at least a header and a payload, wherein at least a portion of the payload comprises at least multiplexed voice, data, and video information, and wherein the electronic processor comprises:
a header processing unit capable of processing at least a portion of the header of the digital input signal; and
a central processor unit capable of receiving the payload and the processed portion of the header of the digital input signal, wherein the central processor unit is coupled to one or more memory devices and one or more buffering devices;
a display processor unit coupled to the central processor unit, wherein the display processor unit generates an electronic control signal based at least in part on the payload of the digital input signal;
a light processing unit capable of receiving at least a portion of the electronic control signal from the display processor unit and modulating light based at least in part on the portion of the electronic control signal, wherein the light processing unit comprises one or more light modulating chips coupled to light directing optics, the one or more modulating chips operable to modulate a one or more of the bands of wavelengths based at least in part on the electronic control signal;
one or more display screens operable to receive the modulated bands of wavelengths communicated from the one or more light modulating chips and to display the modulated bands of wavelengths, wherein at least one of the one or more display screens comprises a plurality of virtual windows originating from the same light processing unit and wherein different virtual windows communicate each of at least a fraction of voice, data, and video information.

11. The light processing device of claim 10, wherein at least some of the one or more light modulating chips are selected from the group consisting of a digital micro-mirror device, a liquid-crystal-on-silicon device, and a liquid crystal display device.

12. The light processing device of claim 10, wherein the light processing unit is a rear projection display or television.

13. The light processing device of claim 12, further comprising a user interface unit coupled to the central processor unit, at least a fraction of the video information comprising an advertisement, and wherein the advertisement is based at least in part on an input entered into the user interface unit.

14. The light processing device of claim 13, wherein the advertisement is unicast to the light processing device.

15. The light processing device of claim 1, wherein the electronic processor is further coupled to a network selected from the group consisting of a fiber distribution network, a coaxial distribution network, and a hybrid fiber/coaxial network.

16. A light processing device comprising:
an electronic processor capable of receiving and processing a digital input signal, the digital input signal comprising an internet protocol format having at least a header and a payload, wherein at least a portion of the payload comprises voice, data, and video information, wherein at least a fraction of the video information comprises an advertisement, and wherein the electronic processor comprises:
a header processing unit capable of processing at least a portion of the header of the digital input signal; and
a central processor unit capable of receiving the payload and the processed portion of the header of the digital input signal, wherein the central processor unit is coupled to one or more memory devices and one or more buffering devices;
a display processor unit coupled to the central processor unit, wherein the display processor unit generates an electronic control signal based at least in part on the payload of the digital input signal;
a light processing unit capable of receiving at least a portion of the electronic control signal from the display processor unit and modulating light based at least in part on the portion of the electronic control signal, wherein the light processing unit comprises one or more light modulating chips coupled to light directing optics, the one or more modulating chips operable to modulate a one or more of the bands of wavelengths based at least in part on the electronic control signal;
one or more display screens operable to receive the modulated bands of wavelengths communicated from the one or more light modulating chips and to display the modulated bands of wavelengths; and
a user interface unit coupled at least to the central processor unit, wherein the advertisement of the at least a fraction of the video information is based at least in part on an input entered into the user interface unit and wherein the advertisement is multiplexed with other video information, voice information, and data of the payload.

17. The light processing device of claim 16, wherein the advertisement is unicast to the light processing device.

18. The light processing device of claim 16, wherein at least some of the one or more light modulating chips are selected from the group consisting of a digital micro-mirror device, a liquid-crystal-on-silicon device, and a liquid crystal display device.

19. The light processing device of claim 16, wherein at least one of the one or more display screens comprises a plurality of virtual windows originating from the same light processing unit and wherein different virtual windows communicate each of at least a fraction of voice, data, and video information.

20. The light processing device of claim 16, wherein the device integrates the functions of a router, a set-top box, an external hard drive, and a display, and wherein the electronic processor is further coupled to a network selected from the group consisting of a fiber distribution network, a coaxial distribution network, and a hybrid fiber/coaxial network.

* * * * *